United States Patent [19]
Matsushita et al.

[11] Patent Number: 5,973,104
[45] Date of Patent: Oct. 26, 1999

[54] HIGH MOLECULAR POLYETHERPOLYESTER AND ITS PRODUCTION PROCESS AND USE

[75] Inventors: Teruki Matsushita, Suita; Hiroshi Itoh, Kobe; Hiroya Kobayashi, Minoo; Koji Fukuhara, Osaka; Yoshinobu Yamamoto, Suita, all of Japan

[73] Assignee: Nippon Shokubai Co., Ltd., Osaka, Japan

[21] Appl. No.: 08/955,065

[22] Filed: Oct. 21, 1997

[51] Int. Cl.$^6$ .............................. C08G 63/12; C08L 67/00
[52] U.S. Cl. ........................ 528/296; 528/274; 528/275; 528/300; 528/301; 524/600
[58] Field of Search ..................................... 528/275, 296, 528/300, 301, 274; 524/600

[56] References Cited

U.S. PATENT DOCUMENTS

| | | | |
|---|---|---|---|
| 3,459,584 | 8/1969 | Caldwell | 528/296 |
| 4,196,129 | 4/1980 | Rhein et al. | . |
| 4,205,158 | 5/1980 | Hoeschele | . |
| 4,521,586 | 6/1985 | Fujita et al. | . |
| 4,528,360 | 7/1985 | Fujita et al. | . |
| 5,062,986 | 11/1991 | Fujita et al. | 252/134 |
| 5,458,920 | 10/1995 | Yezyielev et al. | 525/418 |

FOREIGN PATENT DOCUMENTS

| | | |
|---|---|---|
| 59-226018 | 12/1984 | Japan . |
| 2-107632 | 4/1990 | Japan . |
| 6-32976 | 2/1994 | Japan . |

OTHER PUBLICATIONS

George Odian, "Principles of Polymerization", 2nd Ed. "Polyesters" pp. 102 & 104, John Wiley & Sons. 1981.
Rhein et al., "New Polymer Systems: Chain Extension by Dianhydrides," JPL Quarterly Technical Review, Jan., 1972, pp. 97–103, vol. 1, No. 4.
Rhein et al., "New Polymer Systems: Chain Extension by Dianhydrides," Rubber Chem. Technol., 1972, pp. 1554–1559, vol. 45.
Rhein et al., "New polymer systems: chain extension by dianhydrides," Polymer, Oct. 1973, pp. 466–468, vol. 14.

*Primary Examiner*—Tae Yoon

[57] ABSTRACT

A film-formable high molecular polyetherpolyester comprising structural unit (1) of formula (1) and functional group (2) of formula (2) and having a number-average molecular weight of 40,000 to 10,000,000, wherein the molar ratio of functional group (2) to R in the polyetherpolyester is in the range of 1.0 to 3.0. This polyetherpolyester can be produced by carrying out a chain extension reaction of a low molecular polyalkylene oxide of 1,000 to 30,000 in number-average molecular weight with a polyvalent acid anhydride at 0.003 MPa or higher in a molar ratio of (acid anhydride group)/(hydroxyl group)=0.8 to 1.0.

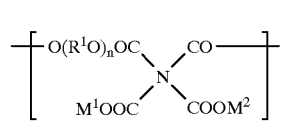

(1)

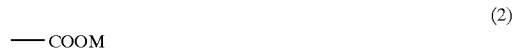

(2)

23 Claims, 5 Drawing Sheets

HIGH MOLECULAR POLYETHERPOLYESTER AND ITS PRODUCTION PROCESS AND USE

BACKGROUND OF THE INVENTION

A. Technical Field

The present invention relates to a high molecular polyetherpolyester and its production process and use, especially, use for films.

B. Background Art

Conventionally, high molecular polyetherpolyesters are used for various purposes, for example, for packing materials by molding the high molecular polyetherpolyester alone or combinations thereof with various additives into sheets or films. It is known that where the high molecular polyetherpolyester is molded into a film, important mechanical properties of the film generally greatly depend on the molecular weight of the high molecular polyetherpolyester. Therefore, the below-mentioned various production processes are studied.

For example, if alicyclic alkylene oxides such as ethylene oxide is subjected to ring-opening polymerization using catalysts such as organometallic complexes, high molecular polyalkylene oxides having polyether structures are obtained. It is possible to obtain a polyalkylene oxide having a molecular weight of several million or more by this process, but at present a process for producing industrially a polyalkylene oxide having a molecular weight of 100,000 to 1,000,000 (such a polyalkylene oxide is assumed to have good moldability) with good efficiency has not yet been found.

In addition, a process is known in which: either or both of ethylene oxide and propylene oxide are subjected to ring-opening polymerization using basic catalysts, for example, comprising either or both of sodium hydroxide and potassium hydroxide, to obtain a low molecular polyalkylene oxide, which is then reacted with various chain-extending agents to convert the polyalkylene oxide into a high molecular one, thus obtaining a high molecular polyetherpolyester. An example of such a process, in which carboxylic diesters are used as the chain-extending agents, is disclosed in Japanese Allowable Patent Publication (Kokoku) No. 5-68493. The molecular weight of the high molecular polyetherpolyester resultant from this process reaches 100,000 or more, but a film of this high molecular polyetherpolyester is very brittle and merely has an elongation of 100% or less. In addition, in the process as mentioned immediately above, because the reaction is run by condensation, an alcohol forms as a by-product, and the system of reaction accordingly needs to be put under vacuum to remove the alcohol. Therefore, high costs for vacuum facilities and for recovering and treating condensation products are needed, and the production efficiency is low.

An example of the process, in which diisocyanates are used as the chain-extending agents, is disclosed in Japanese Patent Application Publication (Kokai) No. 6-32976. Polyurethane resin resultant from this process has so good mechanical strength that the polyurethane resin can be mold-processed, but this polyurethane resin has a problem in that the diisocyanate, which is used for the chain extension reaction, is very toxic. Because there is a danger that the diisocyanate might remain in products, the range of the use of this polyurethane resin is limited to an extremely narrow range. In addition, because the diisocyanate has high reactivity, the reaction thereof is difficult to control, and it is difficult to manage production process steps and the quality of products.

Furthermore, examples of the process to solve the above-mentioned problems are disclosed in (1) Japanese Patent Application Publication (Kokai) No. 58-179227, (2) Japanese Allowable Patent Publication (Kokoku) No. 1-15532, and (3) Polymer, 1973, Vol. 14, October, pp. 466–468, in which acid anhydrides are used as the chain-extending agents. The process as disclosed in document (1) above is a process for producing a high molecular polyetherpolyester from pyromellitic dianhydride and a low molecular polyalkylene oxide. The process as disclosed in document (2) above is a process for producing a high molecular polyetherester copolymer from polyether, of which both terminal ends are hydroxyl groups, using trimellitic anhydride as a branching agent. The process as disclosed in document (3) above is a process for producing a high molecular polyetherpolyester from poly(propylene glycol) and pyromellitic dianhydride.

The high molecular polyetherpolyesters, as obtained by processes (1) to (3) above, all have problems in that their mechanical strength is not high. As to process (1) above, for example, a film of the resultant high molecular polyetherpolyester merely has a tensile strength of less than 80 kgf/cm$^2$ and an elongation of less than 100%, and is very brittle. Also as to process (2) above, the mechanical strength of the resultant high molecular polyetherpolyester is not high. As to process (3) above, the molecular weight only increases to such a degree that an intrinsic viscosity of about 1.6 kg/m$^3$ is displayed, and the resultant molecular weight is not very high.

Where the high molecular polyetherpolyester is produced by the above-mentioned conventional processes, the increase of the molecular weight involves the increase of the viscosity during the production. Where a solvent is used to suppress the increase of the viscosity, a step for removing the solvent is needed at the end of the reaction. Therefore, such a process is not industrially efficient. Where the reaction is carried out at or above a high temperature of 200° C. to suppress the increase of the viscosity, thermal deterioration of the polymer often occurs in the reaction system. The prevention of the thermal deterioration needs expensive additives such as antioxidants, and such a process is not industrially efficient, either.

On the other hand, where the high molecular polyetherpolyester is handled as an industrial product, its form is very important. The shipment form as the industrial product depends on various use purposes, but examples thereof are: (1) a liquid such as a solution of water or an organic solvent; (2) a lump; (3) a powder or flake; (4) a pellet.

Form (1) above might be suitable dependently on use purposes, but has problems in that: the transportation cost increases, or the dissolution consumes time or deteriorates the stability to the passage of time, or the storage needs a wide area. Form (2) above is not industrially very common use form, so the use method is limited. In addition, there is a problem in that automation is difficult. Form (3) above is obtained by mechanically pulverizing the lump and is bearable to various use purposes, but has problems in the step of making a powder or flake. Some high molecular polyetherpolyesters have a glass transition temperature of 0° C. or lower. Therefore, the pulverization of such polyetherpolyesters must be carried out by freeze pulverization that needs freezing-media such as liquid nitrogen or dry ice. Therefore, form (3) provides very bad results with regard to the production efficiency and is therefore not suitable for mass production. In contrast therewith, form (4) above is flexibly correspondable to various use purposes and the most common use form as a medium for molding a thermoplastic resin. In addition, form (4) saves the transportation cost and is advantageous to the storage. However, where the high molecular polyetherpolyester is produced with conventional reaction apparatuses for high viscosity, the production in the form of a pellet is difficult.

SUMMARY OF THE INVENTION

A. OBJECTS OF THE INVENTION

An object of the present invention is to provide a high molecular polyetherpolyester, which is moldable and processable and has high mechanical strength considering its molecular weight and involves no problem of safety.

Another object of the present invention is to provide a process by which the high molecular polyetherpolyester can be produced industrially at a low cost with ease and good efficiency in a short reaction period of time.

Another object of the present invention is to provide a process for producing easily and efficiently the high molecular polyetherpolyester under various reaction conditions such as reaction temperature, reaction period of time, type of raw materials, and ratio of charge of raw materials.

Another object of the present invention is to provide a process for producing easily and efficiently the high molecular polyetherpolyester with a wide range of molecular weight specification.

Another object of the present invention is to provide a process for producing the high molecular polyetherpolyesters in the form of an industrially useful pellet with no molecular weight reduction involved.

Another object of the present invention is to provide a film which has excellent mechanical strength.

B. DISCLOSURE OF THE INVENTION

The present inventors studied about the above-mentioned problems in that the mechanical strength is not obtained by the above-mentioned conventional processes. As a result, they found that: reactions are carried out under vacuum in the above-mentioned conventional processes, and the resultant high molecular polyetherpolyesters have a branched structure, a low carboxyl group content, and a low molecular weight, so the mechanical strength is low. In addition, the inventors found that if a structure of a high molecular polyetherpolyester is formed by linearly linking polyether chains to each other and introducing a specific structure into bonding sites between the linearly linked polyether chains, then the resultant high molecular polyetherpolyester has a high carboxyl group content, displays no increased viscosity, and has a high mechanical strength, considering its molecular weight. Furthermore, the inventors found a process for easily producing a high molecular polyetherpolyester having such a structure, in which the reaction temperature is not raised and no solvent is used, and a process for pelletizing the high molecular polyetherpolyester, and further found that if the high molecular polyetherpolyester as mentioned immediately above is used, a film that is excellent in the mechanical strength can be obtained. As a result, the inventors attained the present invention.

A high molecular polyetherpolyester, according to the present invention, is a high molecular polyetherpolyester which comprises structural unit (1) of formula (1) below and functional group (2) of formula (2) below and has a number-average molecular weight of 40,000 to 10,000,000, wherein the ratio of functional group (2) is in the range of 1.0 to 3.0 mol per mol of R in the polyetherpolyester, wherein formula (1) is:

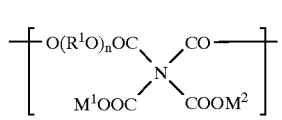

wherein
- $R_1$ is a divalent organic group with 2 to 6 carbon atoms;
- R is a tetravalent organic group with 4 to 20 carbon atoms;
- $M^1$ and $M^2$ are at least one type selected from the group consisting of a hydrogen atom, metal atoms, an ammonium group, and organic amine groups; and
- n is an integer of 25 to 700;

and wherein formula (2) is:

wherein
- M is at least one type selected from the group consisting of a hydrogen atom, metal atoms, an ammonium group, and organic amine groups.

The ratio of structural unit (1) per molecule of the high molecular polyetherpolyester is preferably 20 wt % or more.

Another high molecular polyetherpolyester, according to the present invention, is a high molecular polyetherpolyester which is obtained by a process comprising the step of carrying out a chain extension reaction of a low molecular polyalkylene oxide of a number-average molecular weight of 1,000 to 30,000 with a polyvalent acid anhydride, wherein the polyvalent acid anhydride is divalent acid anhydride (3) of formula (3) below, and functional group (2) of formula (2) below is contained in a ratio of 1.0 to 3.0 mol per mol of R in the high molecular polyetherpolyester, wherein formula (2) is:

wherein
- M is at least one type selected from the group consisting of a hydrogen atom, metal atoms, an ammonium group, and organic amine groups;

and wherein formula (3) is:

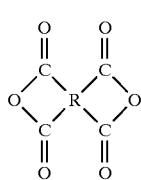

wherein R is a tetravalent organic group with 4 to 20 carbon atoms.

A process for producing a high molecular polyetherpolyester, according to the present invention, comprises the step of carrying out a chain extension reaction of a low molecular polyalkylene oxide of 1,000 to 30,000 in number-average molecular weight with a polyvalent acid anhydride, wherein the chain extension reaction is carried out under conditions where: the polyvalent acid anhydride is divalent acid anhydride (3); the reaction pressure is 0.003 MPa or higher; and the low molecular polyalkylene oxide and the polyvalent acid anhydride are charged such that the acid anhydride group in the polyvalent acid anhydride is in the range of 0.8 to 1.0 mol per mol of the hydroxyl group in the low molecular polyalkylene oxide.

In the production process as mentioned immediately above, the chain extension reaction may be carried out in the presence of a neutralizer.

The above-mentioned neutralizer is preferably added either or both of at the beginning of the chain extension reaction and during the chain extension reaction.

The production process as mentioned immediately above may further comprise the step of reacting a reaction mixture, resultant from the chain extension reaction step, with a neutralizer, thus neutralizing the reaction mixture.

The above-mentioned neutralizer, which may be used in the chain extension reaction step or in the neutralization step, is preferably a carbonic salt.

The present inventors further studied about the production of a high molecular polyetherpolyester. As a result, they found that if the chain extension reaction of the low molecular polyalkylene oxide with the polyvalent acid anhydride is carried out under conditions where the water content in the system of reaction is 5,000 ppm or less, the high molecular polyetherpolyester can be produced more efficiently. The polyalkylene oxide is hydrophilic and usually has a water content of about several percent. Therefore, the polyalkylene oxide introduces the water content into the system of reaction. Where the water content in the system of reaction is large, the polyvalent acid anhydride reacts more readily with water than with the polyalkylene oxide, so the chain extension reaction is difficult to run. However, the conventional production process for a high molecular polyetherpolyester using a chain-extending agent does not involve findings with regard to the control of the water content in the system of reaction, and in addition, a process, in which the chain extension reaction is carried out in the system of reaction with a water content as reduced to a certain amount or less, has not been proposed before.

Thus, in the present invention production process for a high molecular polyetherpolyester, it is preferable that the chain extension reaction of the low molecular polyalkylene oxide with the polyvalent acid anhydride is carried out under conditions where the water content in the system of reaction is 5,000 ppm or less.

In the present invention production process for a high molecular polyetherpolyester, the chain extension reaction is preferably carried out using a reaction apparatus for high viscosity.

The reaction apparatus for high viscosity may have a paddle.

The reaction apparatus for high viscosity may be selected from the group of apparatuses consisting of:
 a single- or twin-screw extruder;
 a sideways type twin-shaft kneader comprising agitation shafts which have a row of transformational wings and are arranged in parallel to each other; and
 an apparatus which comprises both the above-mentioned single- or twin-screw extruder and the above-mentioned sideways type twin-shaft kneader.

Where the reaction apparatus for high viscosity as selected from the above-mentioned group of apparatuses is used, the chain extension reaction may be carried out in the presence of a neutralizer.

Where the reaction apparatus for high viscosity of the type comprising both the above-mentioned single- or twin-screw extruder and the above-mentioned sideways type twin-shaft kneader is used, the present invention production process for a high molecular polyetherpolyester may further comprise the step of pelletizing the resultant high molecular polyetherpolyester.

A film, according to the present invention, comprises the high molecular polyetherpolyester of the present invention and has a tensile strength of 80 kgf/cm$^2$ or more.

Another film, according to the present invention, comprises the high molecular polyetherpolyester of the present invention and has an elongation of 100% or more.

The film of the present invention may be a film as obtained by a process comprising the steps of:
 extruding a resin including the high molecular polyetherpolyester into the shape of a film with a film-molding machine at an outlet temperature of the film-molding machine of 50 to 250° C.; and
 cooling the resultant film to a temperature of −10 to 50° C. in a cooling period of time of 2 seconds to 5 minutes.

The film of the present invention may be hydrophilic.

These and other objects and the advantages of the present invention will be more fully apparent from the following detailed disclosure.

DETAILED DESCRIPTION OF THE INVENTION

High Molecular Polyetherpolyester

Figure 1:
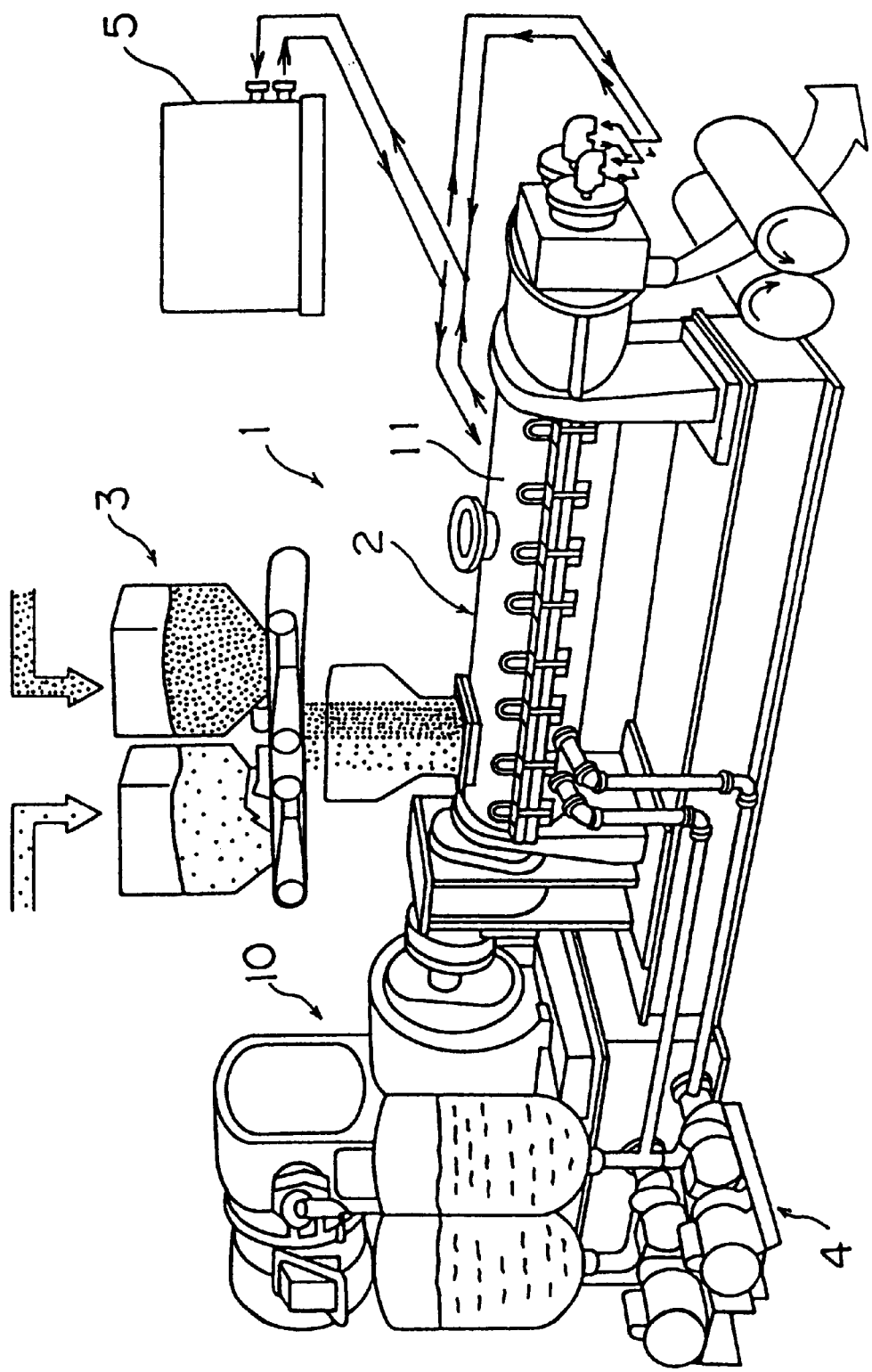
FIG. 1 is a perspective illustrating an example of reaction apparatuses for high viscosity as used in embodiments of the production process according to the present invention.

The high molecular polyetherpolyester comprises structural unit (1) of formula (1) below:

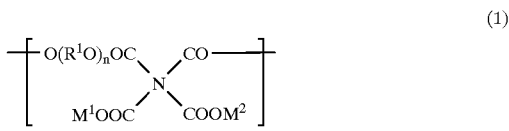

(1)

wherein
 $R^1$ is a divalent organic group with 2 to 6 carbon atoms;
 R is a tetravalent organic group with 4 to 20 carbon atoms;
 $M^1$ and $M^2$ are at least one type selected from the group consisting of a hydrogen atom, metal atoms, an ammonium group, and organic amine groups; and
 n is an integer of 25 to 700.

$R^1$ in formula (1) is not especially limited if it is a divalent organic group with 2 to 6 carbon atoms. Specific examples of $R^1$ include —CH$_2$—CH$_2$—, —CH$_2$—CH$_2$—CH$_2$—, —CH$_2$—CH(CH$_3$)—, —CH$_2$—CH$_2$—CH$_2$—CH$_2$—, —CH(CH$_3$)—CH$_2$—CH$_2$—, —CH$_2$—CH(CH$_3$)—CH$_2$—, —CH$_2$—CH(CH$_2$CH$_3$)—, —CH$_2$—CH$_2$—CH$_2$—CH$_2$—CH$_2$—, —CH(CH$_3$)—CH$_2$—CH$_2$—CH$_2$—, —CH$_2$—CH (CH$_3$)—CH$_2$—CH$_2$—, —CH$_2$—CH$_2$—CH(CH$_2$CH$_3$)—, —CH$_2$—CH(CH$_2$CH$_2$CH$_3$)—, —CH$_2$—CH$_2$—CH$_2$—CH$_2$—CH$_2$—CH$_2$—, —CH(CH$_3$)—CH$_2$—CH$_2$—CH$_2$—CH$_2$—, —CH$_2$—CH(CH$_3$)—CH$_2$—CH$_2$—CH$_2$—, —CH$_2$—CH$_2$—CH(CH$_3$)—CH$_2$—CH$_2$—, —CH(CH$_2$CH$_3$)—CH$_2$—CH$_2$—CH$_2$—, —CH$_2$—CH(CH$_2$CH$_3$)—CH$_2$—CH$_2$—, —CH$_2$—CH$_2$—CH(CH$_2$CH$_2$CH$_3$)—, —CH$_2$—CH(CH$_2$CH$_2$CH$_3$)—CH$_2$—, —CH$_2$—CH(CH$_2$CH$_2$CH$_2$CH$_3$)—, —CH$_2$—CH(CH$_2$Cl)—, —CH$_2$—CH$_2$—CH(CH$_2$Cl)—. These $R^1$ groups may be contained alone or, if necessary, in combinations of two or more thereof. Particularly, at least one $R^1$ selected from the group consisting of —CH$_2$—CH$_2$—, —CH$_2$—CH(CH$_3$)—, and —CH$_2$—CH$_2$—CH$_2$—CH$_2$—is preferable, because these $R^1$ are easily available and inexpensive.

R in formula (1) is not especially limited if it is a tetravalent organic group with 4 to 20 carbon atoms. Specific examples of R include structural units (1), containing R, for example, of the below-mentioned formulae (4) to (14). These structural units (1) containing R may be contained alone or, if necessary, in combinations of two or more thereof in the high molecular polyetherpolyester.

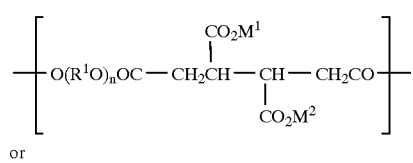

(4)

or

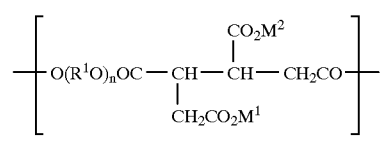

(5)

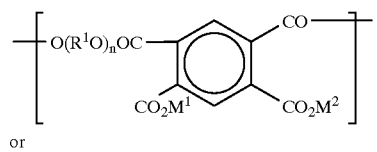

or

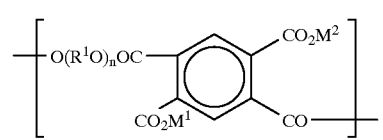

(6)

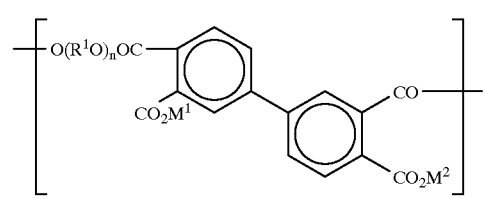

or

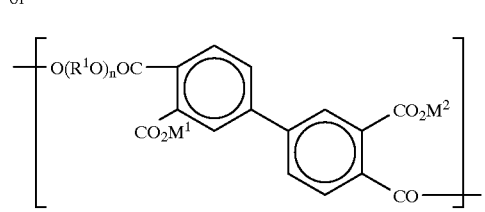

-continued

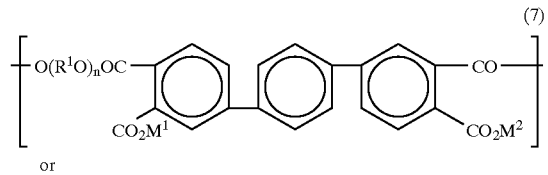

(7)

or

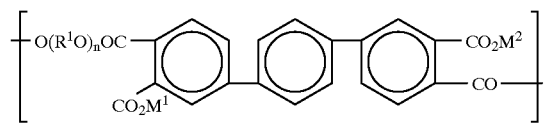

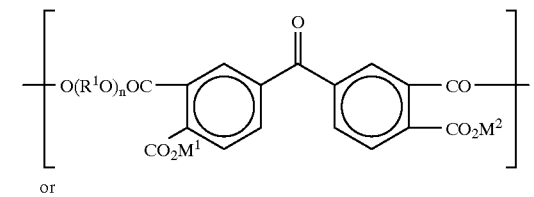

(8)

or

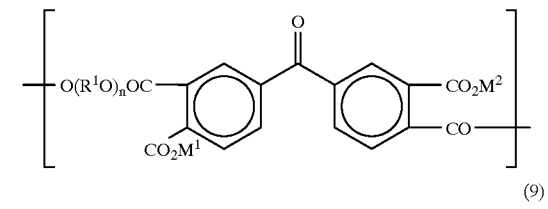

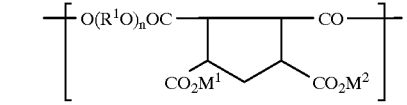

(9)

or

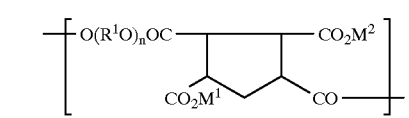

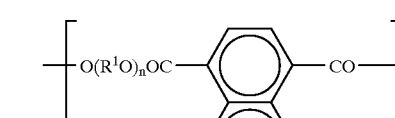

(10)

or (11)

or

-continued

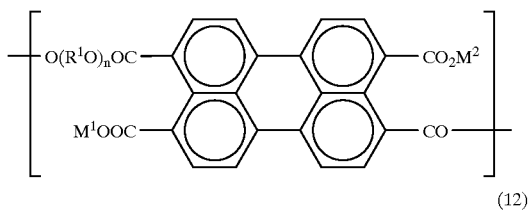

(12)

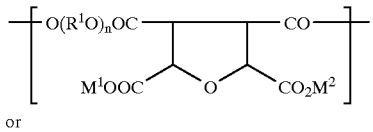

or

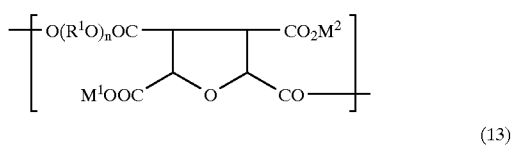

(13)

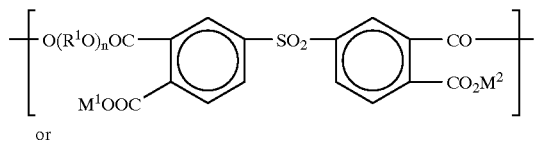

or

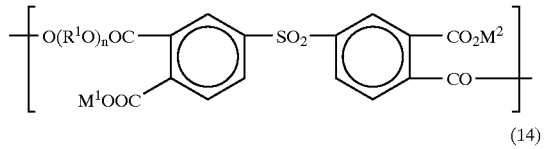

(14)

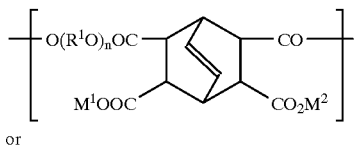

or

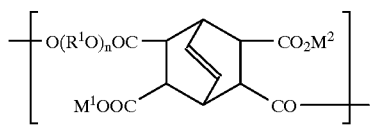

In formulae (4) to (14) above, $R^1$ is a divalent organic group with 2 to 6 carbon atoms, $M^1$ and $M^2$ are at least one type selected from the group consisting of a hydrogen atom, metal atoms, an ammonium group, and organic amine groups, and n is an integer of 25 to 700.

R bears two functional groups (2) of the below-mentioned formula (2) (hereinafter, functional group (2) of formula (2) may simply be referred to as "functional group (2)"). In addition, R forms the principal chain of the high molecular polyetherpolyester by repeating structural unit (1) of formula (1) through bonding with two ester groups. R bears two functional groups (2) and two ester groups, and there is no especial limitation with regard to the combination of these individual bonding chains with functional group (2) or with the ester group.

—COOM (2)

In formula (2) above, M is at least one type selected from the group consisting of a hydrogen atom, metal atoms, an ammonium group, and organic amine groups.

The integer n in formula (1) is not especially limited if it falls within the range of 25 to 700. The integer n is preferably within the range of 50 to 650, more preferably, 100 to 570, most preferably, 160 to 530. Where the integer n is smaller than these ranges, there are economical disadvantages in that the ratio of R, as derived from the below-mentioned expensive polyvalent acid anhydride, to the high molecular polyetherpolyester is large. In addition, where the integer n is larger than the above-mentioned ranges, the below-mentioned carboxyl value to the high molecular polyetherpolyester is low and the cohesive force is lost, so the molding is difficult.

$M^1$ and $M^2$ in formula (1) are at least one type selected from the group consisting of a hydrogen atom, metal atoms, an ammonium group, and organic amine groups, and may be identical with or different from each other. When $M^1$ or $M^2$ is a hydrogen atom, the aforementioned functional group (2) is a carboxyl group. When $M^1$ or $M^2$ is a metal atom, functional group (2) is a functional group including a metal carboxylate as formed by displacement of the hydrogen atom in a carboxyl group with a metal atom. When $M^1$ or $M^2$ is an ammonium group, functional group (2) is a functional group including an ammonium carboxylate as derived from ammonia. In addition, when $M^1$ or $M^2$ is an organic amine group, functional group (2) is a functional group including an organic amine salt of a carboxylic acid as displaced with a functional group as derived from an organic amine.

The metal atom is not especially limited if it is capable of forming a salt with a carboxyl group. Specific examples of the metal atom include lithium, sodium, potassium, rubidium, cesium, francium, beryllium, magnesium, calcium, strontium, barium, radium, titanium, zirconium, hafnium, vanadium, niobium, chromium, molybdenum, tungsten, manganese, iron, ruthenium, osmium, cobalt, rhodium, iridium, nickel, copper, silver, zinc, cadmium, mercury, aluminum, gallium, indium, thallium, silicon, germanium, tin, lead, antimony, bithmuth, scandium. These metal atoms may be used alone or, if necessary, in combinations of two or more thereof. Particularly, at least one metal atom selected from the group consisting of lithium, sodium, potassium, rubidium, cesium, magnesium, calcium, strontium, barium, chromium, manganese, iron, cobalt, nickel, copper, zinc, aluminum, titanium, and zirconium is preferable, because these metal atoms are easily available and inexpensive, and relatively easy to handle, and easy to introduce in the form of carboxylic salts, and forms relatively stable salts, and further, enhance the mechanical strength of the resultant high molecular polyetherpolyester.

The organic amine group in the present invention has a structure in which: the central nitrogen atom has a valency of 4, at least one of substituents as bonded to the nitrogen atom is an organic group, and further, at least one of substituents as bonded to the nitrogen atom is a hydrogen atom. The organic amine group is not especially limited if it has a structure that is derived from an organic amine and can form a salt from the organic amine and a carboxyl group. Specific examples of such an organic amine include hydrazine, trimethylamine, triethylamine, tripropylamine, pyridine, pyrrolidine, pyrrole, dimethylamine, diethylamine, dipropylamine, hexamethylenediamine, 1,4-diazabicyclo[2.2.2]octane, N,N-dimethylcyclohexylamine, ethylamine, aniline, toluidine, allylamine, diallylamine, triallylamine, isopropylamine, diisopropylamine, 3,3'-iminobis(propylamine), 2-ethylhexylamine, 3-(2-ethylhexyloxy)propylamine, 3-ethoxypropylamine, diisobutylamine, 3-(diethylamino)propylamine, di-2-ethylhexylamine, 3((di)butylamino)propylamine, tetramethylethylenediamine, tri-n-octylamine, tert-butylamine, 2-butylamine, picoline, vinylpyridine, pipecoline, piperazine, piperidine, pyrazine, monoethanolamine, diethanolamine, triethanolamine. These organic amines may be used alone or, if necessary, in combinations of two or more thereof. Particularly, at least one organic amine selected from the group consisting of triethylamine, pyridine, tripropylamine, 1,4-diazabicyclo[2.2.2]octane, and tetramethylethylenediamine is preferable, because these organic amines are easily available and inexpensive and are easily introduced in the form of carboxylic salts.

Metal atoms with a valency of 2 or more and amines with two or more amino groups in their molecules may be crosslinked between carboxylic acids on side chains of the high molecular polyetherpolyester. If so, such a crosslinked structure serves to increase the molecular weight and has an effect to enhance the mechanical strength. In addition, the resultant high molecular polyetherpolyester of such a crosslinked structure has fluidity due to dissociation of ionic bonding in a high temperature region where the high molecular polyetherpolyester melts, and such a high molecular polyetherpolyester therefore has ideal properties as a high molecular material and accordingly does not involve the decrease of the strength due to gelation, unlike carbon-carbon crosslinked structures.

The ratio of functional group (2) in the high molecular polyetherpolyester is not especially limited if it is in the range of 1.0 to 3.0 mol per mol of R in the high molecular polyetherpolyester. This ratio is preferably in the range of 1.5 to 2.8 mol, more preferably, 1.7 to 2.6 mol, most preferably, 1.8 to 2.5. If the molar number of functional group (2) per mol of R in the high molecular polyetherpolyester (which hereinafter may be referred to as "carboxyl value") is in the above-mentioned ranges, the cohesive force between functional groups (2) and the molecular weight of the high molecular polyetherpolyester are well-balanced, and the resultant high molecular polyetherpolyester has moldable and high mechanical strength. Where the carboxyl value is less than the above-mentioned ranges, the cohesive force between functional groups (2) is insufficient, and the moldable high mechanical strength is not obtained. In addition, where the carboxyl value is more than the above-mentioned ranges, there are economical disadvantages in that the ratio of R, as derived from the below-mentioned expensive polyvalent acid anhydride, to the high molecular polyetherpolyester is large.

The ratio of structural unit (1) per molecule of the high molecular polyetherpolyester is preferably at least 20 wt %, more preferably, at least 50 wt %, still more preferably, at least 70 wt %, most preferably, at least 85 wt %. Where the ratio of structural unit (1) is less than 20 wt %, the branching degree of the high molecular polyetherpolyester is high, many unfavorable branches that cause gelation are included in the molecule, and the mechanical strength is therefore deteriorated.

Where the high molecular polyetherpolyester has no structural unit other than structural unit (1), such a high molecular polyetherpolyester does not have any crosslinked structure, but has a linear structure with no branch, and therefore has a large carboxyl value. Furthermore, the mechanical strength is favorably enhanced due to cohesion of functional groups (2) on side chains of the high molecular polyetherpolyester.

The high molecular polyetherpolyester may further have a structural unit other than structural unit (1). Specific examples of the structural unit other than structural unit (1) include: structural unit (a), in which one of functional groups (2) in formula (1) is displaced with a carboxyl group that is bonded and crosslinked to a polymer chain of another high molecular polyetherpolyester through an ester bond; and structural unit (b), in which both functional groups (2) in formula (1) are displaced, respectively, with a carboxyl group that is bonded and crosslinked to a polymer chain of another high molecular polyetherpolyester through an ester bond. The below-mentioned formula (15) shows structural unit (a), and the below-mentioned formula (16) shows structural unit (b).

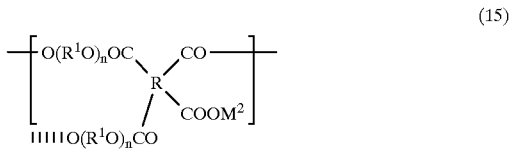

(15)

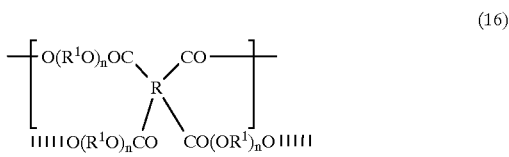

(16)

The ratio of structural unit (a) in the high molecular polyetherpolyester is not especially limited if this ratio keeps the carboxyl value in the range of 1.0 to 3.0 mol per mol of R. Where the carboxyl value per mol of R deviates from this range, the mechanical strength is low. Therefore, the ratio of structural unit (a) is preferably 30 wt % or less.

It is preferable that the ratio of structural unit (b) in the high molecular polyetherpolyester is 20 wt % or less, and it is most preferable that no structural unit (b) is contained because the containing of structural unit (b) reduces the carboxyl value per mol of R and therefore greatly deteriorates the mechanical strength. The number-average molecular weight of the high molecular polyetherpolyester is in the range of 40,000 to 10,000,000, preferably, 45,000 to 5,000,000, more preferably, 50,000 to 2,000,000, most preferably, 55,000 to 1,000,000. Where the number-average molecular weight is less than these ranges, mechanical properties are low, and the mold-processing is impossible. In addition, where the number-average molecular weight is more than the above-mentioned ranges, it takes a long time to produce the high molecular polyetherpolyester, and the production is therefore difficult, and furthermore, the melt viscosity during the mold-processing is so excessively high that the processing is difficult. In addition, the elevation of the temperature lowers the melt viscosity, but causes great thermal deterioration.

In addition, the high molecular polyetherpolyester may be a high molecular polyetherpolyester which is obtained by a process comprising the step of carrying out a chain extension reaction of a low molecular polyalkylene oxide of a number-average molecular weight of 1,000 to 30,000 with a polyvalent acid anhydride, wherein the polyvalent acid anhydride is divalent acid anhydride (3) of formula (3) below, and functional group (2) of the above-mentioned formula (2) is contained in a ratio of 1.0 to 3.0 mol per mol of R in the high molecular polyetherpolyester, wherein formula (3) is:

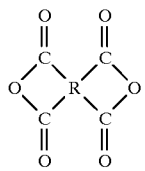

(3)

wherein R is a tetravalent organic group with 4 to 20 carbon atoms.

The low molecular polyalkylene oxide is not especially limited if it has a number-average molecular weight of 1,000 to 30,000. Specific examples of the low molecular polyalkylene oxide include: those which are obtained from alicyclic ethers with 2 to 6 carbon atoms or from aliphatic glycols with 2 to 6 carbon atoms, such as poly(ethylene glycol), poly(propylene glycol), poly(tetraethylene glycol), polyepichlorohydrin, and copolymers thereof. These low molecular polyalkylene oxides may be used alone or, if necessary, in combinations of two or more thereof.

The low molecular polyalkylene oxide is preferably at least one type selected from the group consisting of poly (ethylene glycol), poly(propylene glycol), and poly (tetraethylene glycol), because these low molecular polyalkylene oxides enhance the molecular weight of the resultant high molecular polyetherpolyester and give the high molecular polyetherpolyester industrially efficiently.

The number-average molecular weight of the low molecular polyalkylene oxide is in the range of 1,000 to 30,000, preferably, 2,000 to 28,000, more preferably, 4,000 to 26,000, most preferably, 7,000 to 24,000. Where the number-average molecular weight is less than these ranges, the melting point of the low molecular polyalkylene oxide is 40° C. or lower, and the low molecular polyalkylene oxide might therefore be liquid, and further, the low molecular polyalkylene oxide easily absorbs the water content, and unless this water content is sufficiently removed, the molecular weight of the resultant high molecular polyetherpolyester cannot be enhanced. In addition, a low molecular polyalkylene oxide with a number-average molecular weight of more than the above-mentioned ranges causes thermal deterioration during the reaction and gives a product of which the terminal ends are not hydroxyl groups.

The polyvalent acid anhydride is used as the chain-extending agent for the low molecular polyalkylene oxide and is not especially limited if it has two or more acid anhydride groups in the molecule. Specific examples of the polyvalent acid anhydride include: divalent acid anhydrides such as butane-1,2,3,4-tetracarboxylic dianhydride, pyromellitic dianhydride, biphenyltetracarboxylic dianhydride, p-terphenyl-3,4,3',4'-tetracarboxylic dianhydride, 3,3',4,4'-benzophenonetetracarboxylic dianhydride, 1,2,3,4 cyclopentanetetracarboxylic dianhydride, naphthalene-1,4,5,8 tetracarboxylic dianhydride, 3,4,9,10-perylenetetracarboxylic dianhydride, 2,3,4,5-tetrahydrofurantetracarboxylic dianhydride, 3,3',4,4'-diphenylsulfonetetracarboxylic dianhydride, and bicyclo[2,2,2]oct-7-ene-2,3,5,6-tetracarboxylic dianhydride; trivalent or more polyvalent acid anhydrides such as maleic anhydride-styrene copolymers, maleic anhydride-vinyl acetate copolymers, maleic anhydride-vinyl chloride copolymers, maleic anhydride-butadiene copolymers, maleic anhydride-methyl vinyl ether copolymers, and maleic anhydride-ethylene copolymers. These polyvalent acid anhydrides may be used alone or, if necessary, in combinations of two or more thereof.

A preferable polyvalent acid anhydride is divalent acid anhydride (3) of formula (3) (the divalent acid anhydride may herein be referred to as "acid dianhydride"), because such a divalent acid anhydride gives a high molecular polyetherpolyester which does not have any crosslinked structure, but has a linear structure with no branch (such a linear structure enables functional group (2) to cohere), and therefore is moldable and has high mechanical strength considering its molecular weight. Particularly, at least one divalent acid anhydride selected from the group consisting of pyromellitic dianhydride and butane-1,2,3,4-tetracarboxylic dianhydride is preferable, because these divalent acid anhydrides have high reactivity and enhance production efficiency.

As to R in formula (3), the same R as that in the aforementioned formula (1) is used, and preferable ones are also the same for the same reason as of that in formula (1). In addition, the carboxyl value of a high molecular polyetherpolyester as obtained by reacting the low molecular polyalkylene oxide of 1,000 to 30,000 in number-average molecular weight with the polyvalent acid anhydride is preferably in the same range for the same reason as of that of a high molecular polyetherpolyester containing structural unit (1) as aforementioned.

The process for the reaction between the low molecular polyalkylene oxide and divalent acid anhydride (3) is not especially limited, but the below-mentioned production process is preferable. In addition, the high molecular polyetherpolyester containing functional group (2) in which M in formula (2) is at least one type selected from the group consisting of metal atoms, an ammonium group, and organic amine groups is obtained by using at least one neutralizer selected from the group consisting of metallic compounds or simple substances, containing the aforementioned metal atoms, and ammonia and the aforementioned amines, depending on the type of M, in the below-mentioned production process for a high molecular polyetherpolyester.

The high molecular polyetherpolyester, for example, can be used as the below-mentioned molding material and processed into a film or sheet.

Production Process for the High Molecular Polyetherpolyester

A process for producing a high molecular polyetherpolyester comprises the step of carrying out a chain extension reaction of a low molecular polyalkylene oxide of 1,000 to 30,000 in number-average molecular weight with a polyvalent acid anhydride, wherein the chain extension reaction is carried out under conditions where: the polyvalent acid anhydride is divalent acid anhydride (3); the reaction pressure is 0.003 MPa or higher; and the low molecular polyalkylene oxide and the polyvalent acid anhydride are charged such that the acid anhydride group in the polyvalent acid anhydride is in the range of 0.8 to 1.0 mol per mol of the hydroxyl group in the low molecular polyalkylene oxide.

Hereinafter, the step of carrying out a chain extension reaction of the low molecular polyalkylene oxide with the polyvalent acid anhydride (chain extension reaction step) is explained in detail. As to the low molecular polyalkylene oxide and the polyvalent acid anhydride, there is no especial limitation, but the compounds as aforementioned as specific examples are preferable for the same reason as the aforementioned. The molar number (which hereinafter may be referred to as "molar charge ratio") of the acid anhydride group in the polyvalent acid anhydride per mol of the hydroxyl group in the low molecular polyalkylene oxide is not especially limited if it is in the range of 0.8 to 1.0 mol. The molar charge ratio is preferably in the range of 0.85 to 1.0 mol, more preferably, 0.87 to 1.0 mol, most preferably, 0.90 to 1.0 mol. Where the molar charge ratio is less than these ranges, a large amount of an unreacted portion of the low molecular polyalkylene oxide remains in the resultant polymer, and the mechanical strength is therefore low. In addition, where the molar charge ratio is more than the above-mentioned ranges, a large amount of low molecular polyalkylene oxide as blocked by the polyvalent acid anhydride forms in the system of reaction. Furthermore, also as to a high molecular polyetherpolyester standing on its propagation way, both terminal ends thereof are blocked by the polyvalent acid anhydride, so the hydroxyl group which is a propagation factor in the reaction disappears from the system of reaction, and the reaction therefore terminates. As a result, a large amount of low molecular polyalkylene oxide of which both terminal ends are blocked by the polyvalent acid anhydride is present in the product, and the mechanical strength is therefore low.

In the production process for the high molecular polyetherpolyester, the polyvalent acid anhydride is divalent acid anhydride (3). Divalent acid anhydride (3) is not especially limited, but examples thereof include the compounds as aforementioned as specific examples. It is preferable that the polyvalent acid anhydride is divalent acid anhydride (3) because the resultant high molecular polyetherpolyester basically does not have any crosslinked structure, but has a linear structure with no branch, and therefore displays high mechanical strength. Particularly, at least one divalent acid anhydride selected from the group consisting of butane-1,2,3,4-tetracarboxylic dianhydride and pyromellitic dianhydride is preferable because these compounds have high reactivity and enhance the production efficiency.

The reaction temperature in the production process for the high molecular polyetherpolyester is not especially limited. The reaction temperature is preferably in the range of 70 to 250° C., more preferably, 80 to 200° C., most preferably, 90 to 180° C. If the reaction temperature is in these ranges, the reaction can efficiently be carried out and thermal deterioration of the high molecular polyetherpolyester hardly occurs, so the below-mentioned additives such as antioxidants is not needed, or the amount of the below-mentioned expensive stabilizers such as antioxidants as used can be reduced to the smallest necessary amount.

The reaction pressure in the production process for the high molecular polyetherpolyester is not especially limited if it is 0.003 MPa or higher. The reaction pressure is at lowest 0.030 MPa, more preferably, at lowest 0.080 MPa, most preferably, at lowest 0.094 MPa. Where the reaction pressure is too low, the system of reaction is put under vacuum, and a dehydration reaction between the carboxyl group in the resultant high molecular polyetherpolyester and the hydroxyl group in the low molecular polyalkylene oxide (which is a side reaction) is accelerated, thereby forming a by-product in which the carboxyl group is esterified. Where the esterified product forms, the carboxyl value of the high molecular polyetherpolyester decreases, the cohesive force of functional groups (2) between molecules of the high molecular polyetherpolyester is lost, and the mechanical strength greatly deteriorates.

As is aforementioned, the reaction pressure is not especially limited if it is 0.003 MPa or higher, but the reaction pressure may have an upper limit: the reaction pressure is preferably at highest 2.0 MPa, more preferably, at highest 1.5 MPa, still more preferably, at highest 1.0 MPa, most preferably, at highest 0.3 MPa. Where the reaction pressure is too high, production facilities for increasing the pressure are needed, and the production efficiency might decrease due to the increase of the pressure.

In the production process for the high molecular polyetherpolyester, (1) the chain extension reaction of the low molecular polyalkylene oxide with the polyvalent acid anhydride may be carried out in the presence of a neutralizer, or (2) after the chain extension reaction of the low molecular polyalkylene oxide with the polyvalent acid anhydride, the resultant reaction mixture may be neutralized with a neutralizer. The neutralizer may be added at any time of before, at the beginning of, during, and after the chain extension reaction. As is mentioned below, however, it is preferable for shortening the reaction period of time or simplifying production process steps that the addition of the neutralizer is carried out either or both of at the beginning of the chain extension reaction and during the chain extension reaction.

As to process (2) above (in which after the chain extension reaction between the low molecular polyalkylene oxide and the polyvalent acid anhydride has been carried out (for example, either or both of in a state where the reaction has nearly been completed and after the reaction has been completed), the resultant reaction mixture is reacted with the neutralizer to thereby introduce the neutralizer into a carboxyl group on a side chain), the melt viscosity of the high molecular polyetherpolyester resultant from the reaction is extremely high when the neutralizer has been introduced. Therefore, process (2) needs a longer time for introducing uniformly the neutralizer into a carboxyl group on a side chain than process (1) as mentioned previously. In addition, in almost all cases, not a small amount of the neutralizer as added does not react, but remains in the resultant polymer in a non-uniform state. When the formed non-uniform polymer as obtained in this way is molded into a film, the neutralizer which has not been taken into the polymer spreads spottedly. Where such a film is extended, this film breaks because neutralizer-spotted portions thereof are very brittle.

There is a method for solving such a problem. In this method, the unneutralized resultant high molecular polyetherpolyester is diluted with a solvent. Although the dilution with a solvent facilitates the agitation, the dilution with a considerably large amount of solvent is needed for dispersing sufficiently the neutralizer into a solution of the resultant polymer and reacting them sufficiently. Even if the agitation efficiency is enhanced by diluting the resultant polymer with a solvent, the solvent must be removed by carrying out devolatilization under vacuum after the neutralization. It takes a long time under high vacuum and high temperature to remove the solvent as once dissolved and taken into the high viscosity polymer. Therefore, the efficiency is very bad.

In the above-mentioned respect, process (1) above is preferable, in which the chain extension reaction between the low molecular polyalkylene oxide and the polyvalent acid anhydride is carried out in the presence of the neutralizer. Furthermore, it is preferable that the neutralizer is allowed to be present either or both of at the beginning of and during the chain extension reaction. Either or both of if the neutralizer is allowed to be present at the beginning of the chain extension reaction and if the neutralizer is allowed to be present continuously from the beginning of the chain extension reaction till before the completion of the chain extension reaction while carrying out the chain extension reaction, the problems with regard to process (2) above do not occur, and the neutralizer is efficiently introduced in the form of a carboxylic salt of the resultant polymer, and the great mechanical strength is displayed.

Specific examples of the neutralizer as used in the present invention includes at least one type selected from the group consisting of metallic compounds, metallic simple substances, ammonia, and amines.

Specific examples and preferable examples of metal atoms constituting the metallic compounds and the metallic simple substances, as can be used as the neutralizer, are the same as those of the aforementioned metal atom that is an example of M, $M^1$, and $M^2$ in the aforementioned formulae.

Examples of the metallic compound include oxides, carboxylates, metal alkoxides, carbonates, hydroxides, hydrides, peroxides, chlorides, sulfates, nitrates, phosphates, sulfites, and carbides of the aforementioned metal atoms. These metallic compounds may be used alone or, if necessary, in combinations of two or more thereof. Particularly, at least one metallic compound selected from the group consisting of oxides, carbonates, hydroxides, and carboxylates, especially, at least one carbonate, is preferable, because these metallic compounds have good compatibility with the low molecular polyalkylene oxide and with the high molecular polyetherpolyester and therefore make it possible to easily introduce the metal, and have high safety and are easy to handle during the production and inexpensive.

The metallic simple substance itself, which is not the metallic compound, can be used as the neutralizer. Specific examples of the metallic simple substance include lithium, sodium, and potassium. Where these metallic simple substances are used, however, there is a high danger that they react with air or moisture and cause fires, so assurance of the safety needs to be made doubly sure.

Specific examples and preferable examples of the amine, as can be used as the neutralizer, are the same as those of the aforementioned organic amine from which the organic amine group that is an example of M, $M^1$, and $M^2$ in formulae (1) and (2) is derived.

The amount of the neutralizer as used is not especially limited if it is in the range of 0.001 to 10.0 mol per mol of the polyvalent acid anhydride. This amount is preferably in the range of 0.01 to 6.0 mol, more preferably, 0.05 to 5.0 mol, most preferably, 0.1 to 4.0 mol. Where the amount of the addition is larger than these ranges, the neutralizer cannot uniformly disperse or dissolve into the high molecular polyetherpolyester, so the mechanical strength of the resultant high molecular polyetherpolyester is low. In addition, where the amount of the neutralizer is small, the reaction period of time is long, and the production efficiency is therefore low. Where the amount of the addition of the neutralizer is smaller than the above-mentioned ranges, a pH-adjusting effect and a mechanical strength-enhancing effect which are effects of the addition of the neutralizer are greatly lowered.

As to the method for adding the neutralizer, the neutralizer may be added either or both of at once and continuously.

In the production process for the high molecular polyetherpolyester, usable components other than the aforementioned low molecular polyalkylene oxide, the polyvalent acid anhydride, and the neutralizer are, for example, as follows: solvents, antioxidants, ultraviolet absorbers, crystal-nucleating agents.

In the production process for a high molecular polyetherpolyester, when the chain extension reaction of the low molecular polyalkylene oxide with the polyvalent acid anhydride is carried out, the water content in the system of reaction is preferably 5,000 ppm or less, more preferably, 1,000 ppm or less, still more preferably, 500 ppm or less, most preferably, 200 ppm or less. Where the water content in the system of reaction is more than these ranges, the polyvalent acid anhydride reacts more readily with water than with the low molecular polyalkylene oxide, so the objective chain extension reaction is difficult to occur, or does not occur at all, because the polyvalent acid anhydride is more reactive upon water than the low molecular polyalkylene oxide is.

The term "system of reaction," referred to herein, means at least one of the low molecular polyalkylene oxide, the polyvalent acid anhydride, the neutralizer, gas residue in the system of reaction, the reaction apparatus, and the raw material-introducing part, and includes all portions that can directly touch the reactants or reaction products or can indirectly touch them through inert gases such as nitrogen, argon, and helium.

Similarly, active hydrogen other than the water content can also be a factor to hinder the chain extension reaction between the low molecular polyalkylene oxide and the polyvalent acid anhydride. Specific examples of the active hydrogen other than the water content include: alcoholic compounds such as methanol, ethanol, propanol, phenol, and ethylene glycol; ammonia; amine compounds such as methylamine and aniline; hydride compounds such as sodium hydride and calcium hydride; hydroxides such as sodium hydroxide and potassium hydroxide; carboxylic compounds with a carboxyl group, such as acetic acid, formic acid, oxalic acid, and acrylic acid; inorganic acids such as sulfuric acid, nitric acid, hydrochloric acid, and phosphoric acid; heteropolyacids such as phosphotungstic acid, phosphomolybdic acid, and trifluoromethanesulfonic acid; and compounds that are volatile under a vacuum of 1 Pa to 0.09 MPa and have substituents reactive upon the acid anhydride group.

Where the above-mentioned compounds having active hydrogen other than the water content are also contained in the system of reaction, the amount of those compounds in the system of reaction is preferably 5,000 ppm or less.

The method for adjusting the water content in the system of reaction is not especially limited, and examples of this method include a method in which the low molecular polyalkylene oxide as used is devolatilized under heat-melting conditions.

In the production process for the high molecular polyetherpolyester, the viscosity is low in the early stage of the reaction, but in the late stage, the viscosity increases along with the molecular weight, and the agitation therefore becomes difficult. Thus, in order to prevent it, a solvent may be used. Specific examples of the reaction solvent include benzene, toluene, xylene, ethylene carbonate, propyl carbonate, methyl acetate, ethyl acetate, propyl acetate, butyl acetate, tetrahydrofuran, 1,4-dioxane, anisole, acetone, methyl ethyl ketone, diethyl ketone, methyl propyl ketone, dichloromethane, dichloroethane, chloroform, carbon tetrachloride, acetonitrile, pyridine, dimethylformamide, ethylenediamine, propylenediamine. These reaction solvents may be used alone or, if necessary, in combinations of two or more thereof.

Where the reaction solvent is used, the agitation is easy during the reaction, but a step of removing the reaction solvent (devolatilization step) is needed after the reaction, and unless the high molecular polyetherpolyester containing the reaction solvent is devolatilized under high vacuum, the reaction solvent cannot entirely be removed, and the production efficiency therefore might decrease.

In such a respect, it is preferable in the production process for the high molecular polyetherpolyester that the reaction is carried out using the reaction apparatus for high viscosity because the production thereby can further easily and efficiently be carried out.

Specific examples of the reaction apparatus for high viscosity include: a sideways type twin-shaft kneader comprising agitation shafts which have a row of transformational wings and are arranged in parallel to each other (trade name "1-Liter Kneader," available from Irie Shokai Co., Ltd.); a self-cleaning sideways type twin-shaft kneader comprising two agitation shafts, which are arranged in parallel to each other, and convex-lens-shaped paddles, which are installed on the agitation shafts in such a manner that the rotational phases of the paddles are shifted from each other; a sideways type twin-shaft kneader comprising agitation parts which have a row of lattice-shaped wings and a non-shaft structure and are arranged in parallel to each other; a sideways type twin-shaft kneader comprising agitation shafts which have a row of spectacles-shaped wings and are arranged in parallel to each other; a tower type kneader comprising a plate-shaped agitation wing, which is arranged inside, and a transformational spiral wing, which is arranged concentrically outside the plate-shaped agitation wing; a tower type kneader comprising a reverse-cone ribbon wing; a tower type kneader comprising an agitation wing which has a row of twisted-lattice-shaped wings and a non-shaft structure.

The reaction apparatus for high viscosity may be either a continuous type or a batch type. An example of the continuous type reaction apparatus for high viscosity is a sideways type twin-shaft kneader (trade name "KRC Kneader," made by Kurimoto, Ltd.) as shown in FIG. 1. This kneader 1 comprises: a kneader main body 2; a solid-supplying part 3 for supplying a predetermined amount of powder or fluid to the kneader main body 2; a liquid-supplying part 4 for supplying a predetermined amount of liquid or slurry liquid to the kneader main body 2; and a heating and cooling unit 5 for heating and cooling the kneader main body 2.

Figure 2:
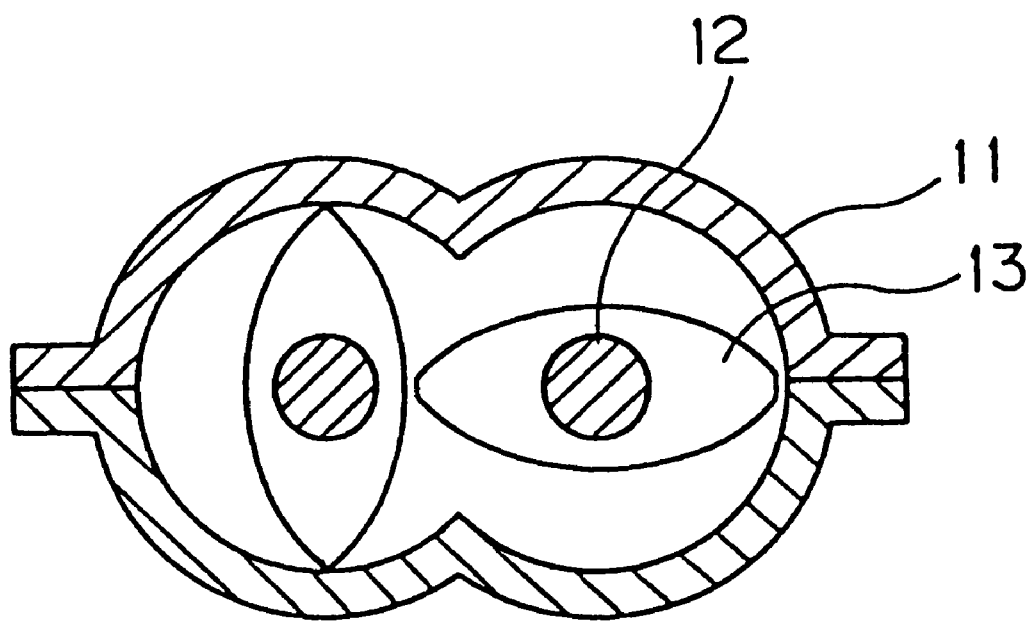
FIG. 2 is a partial section of the reaction apparatus for high viscosity of FIG. 1.

The kneader main body 2 has: a driving part 10 including a motor and a deceleration unit; a two-separable trough 11; and a pair of agitation shafts 12 (FIG. 2) which are supported by the trough 11 so as to freely rotate and are driven by the driving part 10. As is shown in FIG. 2, various types of paddles and screws (not drawn), including convex-lens-shaped paddles 13, are arranged and installed on the agitation shafts 12 in the shaft direction. Each of the paddles 13 is arranged so that their rotational phases are shifted every several paddles. Consequently, even if two kinds of raw materials as supplied into the trough 11 have a high viscosity, they are kneaded and transported with good efficiency in a short period of time.

In this kneader 1, the polyvalent acid anhydride is stocked in the raw-material-supplying part 3, and the low molecular polyalkylene oxide is stocked in the raw-material-supplying part 4. Then, respective predetermined amounts of these two kinds of raw materials are supplied from the supplying parts 3 and 4 into the trough 11, and the low molecular polyalkylene oxide is melted by heating and kneaded along with the polyvalent acid anhydride under normal pressure, thus carrying out a reaction, whereby the high molecular polyetherpolyester is obtained.

Other examples of the reaction apparatus for high viscosity include: a twin-shaft sideways type kneader having spectacles-shaped wings as the agitation wings (trade name "Hitachi Spectacles-Shaped Wing Polymerization Machine," available from Hitachi Seisakusho Co., Ltd.); a twin-shaft sideways type kneader having lattice-shaped wings as the agitation wings (trade name "Hitachi Lattice-Shaped Wing Polymerization Machine," available from Hitachi Seisakusho Co., Ltd.); a twin-shaft sideways type kneader having petal-shaped wings as the agitation wings; a twin-shaft sideways self-cleaning type kneader having center-deviated-disk-shaped wings as the agitation wings (trade name "SCR," made by Mitsubishi Heavy Industries, Ltd.); a twin-shaft sideways type kneader having hollow disk wings or three-paddle wings as the agitation wings (trade name "HVR," made by Mitsubishi Heavy Industries, Ltd.). In addition, an apparatus of trade name "TEX-X" (made by The Japan Steel Works, Ltd.) and a single- or twin-screw extruder, as is widely used for extrusion molding or devolatilization of plastics, are also available. The single- or twin-screw extruder may be a production apparatus which comprises both a single- or twin-screw extruder and a sideways type twin-shaft kneader, wherein the kneader includes agitation shafts which have a row of transformational wings and are arranged in parallel to each other. In this production apparatus, the kneader may be installed in the extruder.

In addition, examples of the batch type reaction apparatus for high viscosity include: a tower type kneader comprising a pair of shafts having agitation wings which are installed on the agitation shafts so as to be arranged concentrically; a tower type kneader having a reverse-cone-ribbon-shaped wing as the agitation wing (trade name "VCR," made by Mitsubishi Heavy Industries, Ltd.); a tower type kneader having a twisted-lattice-shaped wing as the agitation wing (trade name "High Viscosity Batch Type Polymerization Machine," made by Hitachi Seisakusho Co., Ltd.). Among the above-mentioned apparatuses, a preferable one is the production apparatus which comprises both a single- or twin-screw extruder and a sideways type twin-shaft kneader, wherein the kneader includes agitation shafts which have a row of transformational wings and are arranged in parallel to each other. This production apparatus is called "kneader-uder" and is an apparatus having both functions of the kneader and the single- or twin-screw extruder.

Hereinafter, a detailed explanation is made about this production apparatus and the use thereof.

The agitation shaft of the kneader in the production apparatus is not especially limited, and specific examples thereof include Z-types, $\Sigma$-types, Banbury-types.

The extruder in the production apparatus is not especially limited if it is a single- or twin-screw extruder, but the extruder may be a more multiple screw extruder.

The kneader in the production apparatus serves as a reaction vessel for synthesizing the high molecular polyetherpolyester and as a feeder for feeding the formed polyetherpolyester to the extruder to extrude the formed polyetherpolyester into the shape of a strand.

The temperature of the kneader in the production apparatus is not especially limited, but it is preferably in the range of 70 to 300° C., more preferably, 80 to 200° C., most preferably, 90 to 180° C. If this temperature is in these ranges, the reaction can be carried out efficiently, and the thermal deterioration of the high molecular polyetherpolyester hardly occurs.

The kneading period of time during the synthesis with the kneader is not especially limited, but it is preferably in the range of 1 minute to 10 hours, more preferably, 5 minutes to 6 hours. Where the kneading period of time is shorter than these ranges, the resultant molecular weight is not sufficiently large, or the raw materials are not sufficiently mixed. In addition, where the kneading period of time is longer than the above-mentioned ranges, the reduction of the molecular weight due to thermal deterioration occurs, or the time is consumed meaninglessly. Therefore, it is preferable that the kneading period of time for the reaction is shortened to a necessary minimum within the above-mentioned ranges.

In addition, the use of the above-mentioned production apparatus makes it possible to synthesize high molecular polyetherpolyesters of various molecular weights by changing various conditions such as temperature conditions, the kneading period of time, the molecular weight of the starting low molecular polyalkylene oxide, the type of the starting polyvalent acid anhydride, and the charge ratio between the low molecular polyalkylene oxide, the polyvalent acid anhydride, and the neutralizer.

The temperature during the extraction of the formed polymer with the kneader is not especially limited, but it is preferably in the range of 50 to 250° C., more preferably, 60 to 200° C., most preferably, 70 to 180° C. Where the extraction temperature is lower than these ranges, the melt viscosity of the formed polymer is too high, and the extrusion into the shape of a strand is therefore difficult. In addition, where the extraction temperature is higher than the above-mentioned ranges, the extraction temperature is so high that it takes time to cool the strand, the period of time for the pelletization step therefore becomes long, and the production efficiency becomes low, and further, because the extraction takes a long period of time, the reduction of the molecular weight of the formed polymer occurs before the end of the extraction.

The extruder in the aforementioned production apparatus mainly comprises an extrusion screw and a cylinder part, but the temperature of them is not especially limited. The internal temperature of the extruder is preferably in the range of 50 to 250° C., more preferably, 60 to 200° C., most preferably, 70 to 180° C. Where the internal temperature of the extruder is lower than these ranges, the melt viscosity of the formed polymer is too high, and the extrusion into the shape of a strand is therefore difficult. In addition, where the internal temperature of the extruder is higher than the above-mentioned ranges, the extrusion temperature of the polymer is so high that it takes time to cool the strand, the period of time for the pelletization step therefore becomes long, and the production efficiency becomes low, and further, because the extrusion takes a long period of time, the reduction of the molecular weight of the formed polymer occurs before the end of the extrusion.

Figure 3:
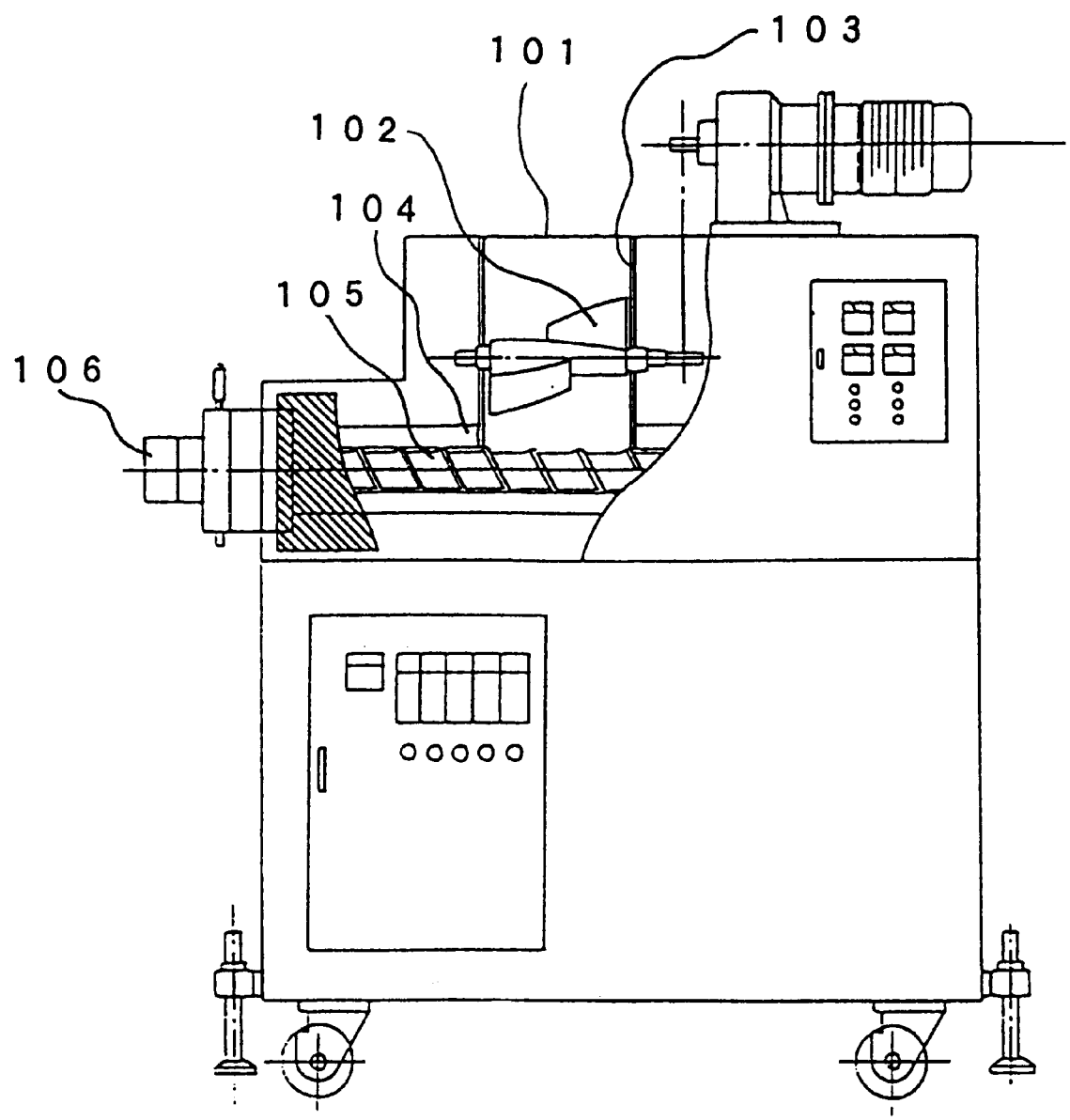
FIG. 3 is a side view illustrating another example of reaction apparatuses for high viscosity as used in embodiments of the production process according to the present invention.

An example of the aforementioned production apparatus, comprising the extruder and the kneader, is shown in FIG. 3 (trade name "Kneaderuder," available from Kasamatsu Kako Kenkyujo).

The kneader in this apparatus comprises a kneader case part 103 and a kneader blade part 102. A powder or liquid is supplied from a raw-material-supplying part 101. The extruder in this apparatus comprises screw 105 and a cylinder 104. After supplying raw materials to the kneader, the kneader blade part 102 is rotated to carry out kneading to run the reaction. During the reaction, the screw 105 is rotated reversely, whereby the raw materials and the formed polymer can be prevented from flowing out. The extruder can be heated and cooled to optional temperature. The formed polymer is extruded from dice 106 into the shape of a strand by rotating the screw 105 forward. After cooling the extruded strand, the pelletization is carried out by cutting the cooled strand into the shape of a pellet, thus obtaining a pellet.

Figure 4:
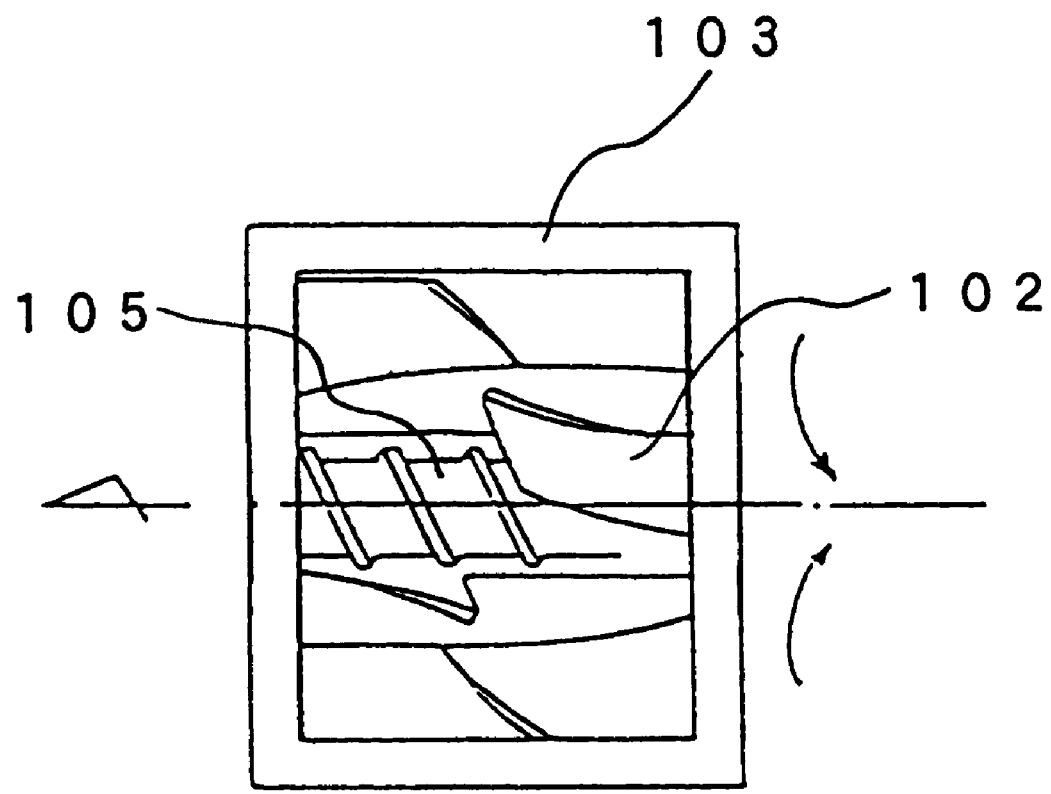
FIG. 4 is a top view illustrating a kneader case part of the apparatus of FIG. 3.

FIG. 4 shows the kneader case part 103. The kneader blade part 102 is installed in the kneader case part 103 and has two kneader blades for the reaction. The screw 105 is located below the kneader blade part 102. During the reaction, the screw 105 is rotated reversely to prevent the raw materials and the formed polymer from flowing out. The reaction is carried out with the kneader blade part 102. After the reaction, while rotating the kneader blade part 102, the screw 105 is rotated forward, whereby the formed polymer is extruded.

There is only a small clearance between the upper part of the screw 105 and the lower part of the kneader blade part 102. Thus, if the kneader blade part 102 is rotated, the polymer in the kneader case part 103 is fed to the screw 105 in such a manner that the polymer is rubbed on the screw 102.

In addition, because there is only a small clearance between the upper part of the screw 105 and the lower part of the kneader blade part 102, even a high viscosity polymer does not rise to the upper part of the kneader case part 103, but can be fed to the screw 105.

Figure 5:
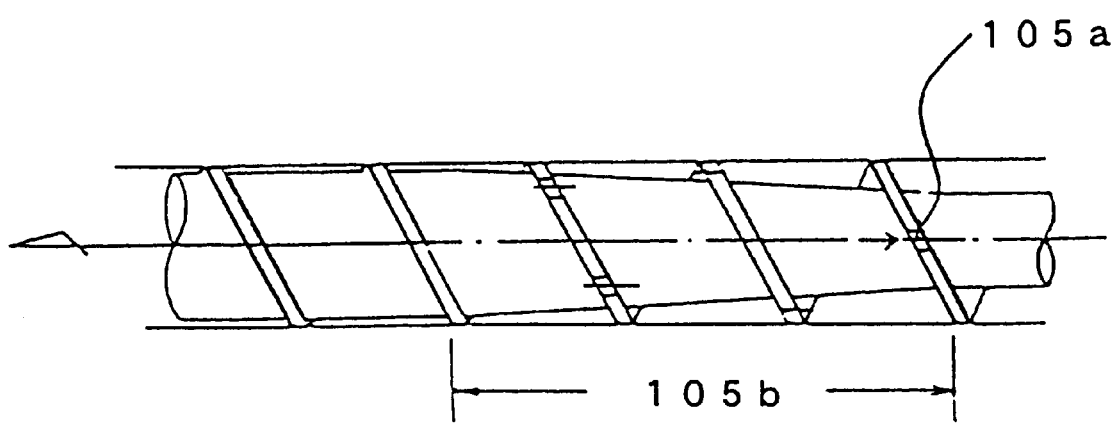
FIG. 5 is a partial side view illustrating a screw of an extruder in the apparatus of FIG. 3.

FIG. 5 shows the shape of the screw 105. The screw 105 is that of a single-screw extruder and has a depth-varying groove and is shaped like a baseball bat. A part of the screw 105, located below the kneader blade part 102, is referred to as taper part 105a where the groove of the screw 105 is deep. The groove of the screw 105 becomes shallower as it approaches the dice 106. Such a shape makes it possible to extrude the strand even under conditions where the resin pressure is tens of kgf/cm$^2$ or more at the dice part 106.

In addition, the screw 105 is characterized in that a notch, which is referred to as screw gate 105b, is formed on the taper part 105a. The pressure on the screw 105 is designed such that the resin pressure becomes higher as the position nears the outlet. Because the resin contains foam, the screw gate 105b is used to defoam the resin utilizing the resin pressure difference. The resin pressure on the screw 105 becomes higher as the position nears the dice 106. Or otherwise, the resin pressure is atmospheric below the kneader blade part 102. Because foam in the resin moves to a lower pressure place, the resin is defoamed. Accordingly, such an apparatus makes it possible to produce a defoamed pellet with no vacuum unit such as a vacuum pump used.

The method for cooling the strand is, for example, air-cooling, water-cooling, cooling with organic solvents as refrigerants, or contacting with cooled rolls or belt conveyors, but it is not especially limited. However, an industrially preferable one is a method in which no cooling medium is used if possible.

The cooling temperature of the strand is not especially limited, but it is preferably in the range of −200 to 200° C., more preferably, −50 to 100° C., most preferably, 20 to 80° C. Where the cooling temperature is lower than these ranges, the cooled strand gets dewy, so a subsequent step of drying the pellet becomes needed, or the resultant high molecular polyetherpolyester tends to hydrolyze due to the dewing. In addition, where the cooling temperature is higher than the above-mentioned ranges, it is much higher than the crystallization temperature of the resultant high molecular polyetherpolyester, the initiation of the solidification of the strand becomes difficult, so the strand does not cool or the cooling period of time becomes very long.

The sectional shape of the strand is commonly a circle, but can be various ones, such as a square, a rectangle, and a star, depending on the use method.

The shape of the pellet as obtained by pelletizing the strand can also be various ones depending on the use method similarly to the sectional shape of the strand.

The size of the pellet as obtained by pelletizing the strand is not especially limited. Where the pellet is used as a thermoplastic resin, the one that has a diameter of about 3 mm and a length of about 3 mm is common and is said to be visually beautiful. However, both the diameter and the length of the pellet can be various ones (e.g. diameter: 0.01–50 mm, length: 0.01–100 mm) depending on use purposes or convenience of mold-processing machines.

The high molecular polyetherpolyester as obtained in the above-mentioned way can effectively be utilized for various purposes, such as the below-mentioned molding material, by mold-processing.

Use of the High Molecular Polyetherpolyester

[Molding Material]

The high molecular polyetherpolyester of the present invention, for example, can favorably be used for a molding material by allowing the molding material to comprise the high molecular polyetherpolyester. Hereinafter, an explanation is made about this molding material comprising the high molecular polyetherpolyester.

When heated in case of need, the molding material preferably has a melt viscosity of 10,000 to 100,000,000 cP, more preferably, 20,000 to 80,000,000 cP, most preferably, 50,000 to 70,000,000 cP. Where the melt viscosity of the molding material is too high, the mold-processing is impossible, or otherwise where the melt viscosity of the molding material is too low, the fluidity is too great to carry out the mold-processing. In addition, the temperature of the molding material during the measurement of the melt viscosity is not especially limited, but this temperature is preferably within the usual molding temperature range of 70 to 200° C., because this temperature range is not lower than the melting point of the high molecular polyetherpolyester and because in this temperature range the thermal deterioration hardly occurs during the molding.

The molding material comprises the high molecular polyetherpolyester as the essential component, but may further comprise other material components. Specific examples of the components other than the high molecular polyetherpolyester include inorganic fillers, ultraviolet absorbers, pigments. The method for molding the molding material is not especially limited. Specific examples of the molding method include injection molding, compression molding, T-die methods, inflation methods, calender methods.

The molding material can be mold-processed into various molded products, such as films and sheets, by the above-mentioned molding methods.

[Film]

Any of the films, according to the present invention comprises the aforementioned high molecular polyetherpolyester. Particularly, a film with a tensile strength of 80 kgf/cm$^2$ or more is hereinafter referred to as film (1), and a film with an elongation of 100% or more is hereinafter referred to as film (2). In addition, both films (1) and (2) may have a tensile strength of 80 kgf/cm$^2$ or more and an elongation of 100% or more.

The high molecular polyetherpolyester in the film is not especially limited if it has a number-average molecular weight of 40,000 to 10,000,000. The number-average molecular weight is preferably in the range of 45,000 to 2,000,000, preferably, 50,000 to 1,000,000. Where the number-average molecular weight is less than these ranges, mechanical properties (tensile strength and elongation) are low, and the molding into a film is impossible. In addition, where the number-average molecular weight is more than the above-mentioned ranges, the melt viscosity is too high to carry out the molding into a film.

The tensile strength of film (1) is not especially limited if it is not less than 80 kgf/cm$^2$. The tensile strength is preferably not less than 85 kgf/cm$^2$, more preferably, not less than 90 kgf/cm$^2$, most preferably, not less than 100 kgf/cm$^2$. Where the tensile strength is out of these ranges, the tensile strength is low, and when used for packing materials, the film might not be able to wrap the contents because the film might rupture due to the weight of the contents.

The elongation of film (2) is not especially limited if it is not less than 100%. The elongation is preferably not less than 200%, more preferably, not less than 500%, most preferably, not less than 700%. Where the elongation is out of these ranges, the elongation is low, the elasticity of the film is low, and the film breaks off. When the force is applied to the film, the elasticity of the film acts as a cushion and serves to prevent the film from breaking off.

The thickness of the film is not especially limited, either. The thickness of the film is preferably in the range of 2 to 700 $\mu$m, more preferably, 5 to 500 $\mu$m, most preferably, 10 to 300 $\mu$m. If the thickness of the film is in these ranges, a soft and tough film can favorably be obtained. If the strength can be ensured with a base material as piled when the film is multilayered, however, there might be no problem even if the film is thinner than 10 $\mu$m.

The production process for the film comprising the high molecular polyetherpolyester is not especially limited, and conventional production processes for films can be applied. Specific examples of the production process for the film include T-die methods, inflation methods, calender methods. In the T-die methods, the inflation methods, and the calender methods, the high molecular polyetherpolyester can be molded into a film by extruding the high molecular polyetherpolyester at a molding machine outlet temperature of 50 to 250° C., preferably, 100 to 180° C. Where the molding machine outlet temperature is higher than these temperature ranges, the melt viscosity of the high molecular polyetherpolyester is very low. In the inflation method, therefore, the film cannot support its weight, and the film is difficult to continuously extract. In addition, in the T-die method, the width of the extruded molten film is narrowed due to the surface tension of the film, so problems of hole-opening or breaking-off occur. Furthermore, where the high molecular polyetherpolyester is preserved at or above 250° C. for a long period of time, thermal deterioration occurs, so the quality of the resultant film is unfavorably lowered. Where the molding machine outlet temperature is lower than the above-mentioned temperature ranges, the melted state of the high molecular polyetherpolyester is not uniform, and it is therefore difficult to obtain a homogeneous film, and the film production efficiency might greatly be decreased due to high melt viscosity.

The melted film as extruded in the above-mentioned way is then cooled to a temperature of –10 to 50° C., preferably, 0 to 45° C., in a cooling time of 2 seconds to 5 minutes, preferably, 5 seconds to 3 minutes, whereby it is possible to obtain a film having good surface smoothness, transparency, uniformity, and mechanical properties with high production efficiency. In the production process for the film, the aforementioned molding material comprising the high molecular polyetherpolyester may be molded.

The resultant film may further be extended in either or both of lengthwise and widthwise directions. The film may further comprise material components other than the high molecular polyetherpolyester. Examples of such material components include stabilizers, crystalnucleating agents, fillers (e.g. organic fillers, inorganic fillers), softeners, pigments, colorants, ultraviolet absorbers, surface brighteners, antioxidants, plasticizers, lubricants. These material components may be added either to the high molecular polyetherpolyester before the film production or to the film after its production. If the amount of the addition of the above-mentioned material components is in the range of 0.0001 to 30 wt % of the high molecular polyetherpolyester, effects of the addition of the material components are obtained.

DETAILED DESCRIPTION OF THE PREFERRED EMBODIMENTS

Hereinafter, the present invention is more specifically illustrated by the following examples of some preferred embodiments in comparison with comparative examples not according to the invention. However, the present invention is not limited to the below-mentioned examples. In addition, in the examples, unless otherwise noted, the unit "part(s)" denote "part(s) by weight."

EXAMPLE A1

A mixture of 10 parts of poly(ethylene glycol) with a number-average molecular weight of 10,000 and 0.207 parts of pyromellitic dianhydride was charged into a 100 ml flask to carry out a chain extension reaction for 3 hours under reaction conditions of 0.099 MPa and 150° C. The resultant high molecular polyetherpolyester (A1) had a number-average molecular weight of 84,000 and a melt viscosity of 102,000 cP. The result of the measurement of the acid number by neutralization titration showed 9.92 mg KOH/g, and the carboxyl value was 1.99.

Film (A1) of 200 μm in thickness was obtained by molding high molecular polyetherpolyester (A1) with a compression molding machine under the following conditions: molding temperature=150° C., molding pressure=100 kgf/cm², and molding time=2 minutes. A tensile test was carried out for film (A1). As a result, the tensile strength was 95 kgf/cm², and the elongation was 912%. These results are collectively shown in Table A1.

In addition, with regard to high molecular polyetherpolyester (A1), measurement results of elemental analysis, infrared absorption spectrum, and $^1$H-NMR are as follows:

Measured Value in Elemental Analysis
H: 9.08% (theoretical value of H: 9.00%)
C: 54.34% (theoretical value of C: 54.50%)

| Infrared absorption spectrum; |
| --- |
| 2954.2 cm$^{-1}$ (C—H, stretching vibration) |
| 1731.6 cm$^{-1}$ (C=O, stretching vibration in carboxyl group and ester group) |
| 1160.1 cm$^{-1}$ (C—O, stretching vibration) |

$^1$H-NMR (δ value, CDCl$_3$)
3.44–3.36 (—OCH$_2$CH$_2$O—, m)
4.44–3.51 (—OH, m)
8.03 (—COOH association, s)
8.08 (aromatic proton derived from pyromellitic dianhydride, 2H, s)
8.12 (—COOH association, s)

The number-average molecular weight, the acid value, the carboxyl value, the melt viscosity, the tensile strength, and the elongation in Example A1, as mentioned above, and in the following Examples and Comparative Examples were measured in the following way:

(Number-average molecular weight)
The number-average molecular weight was measured in terms of polystyrene by gel permeation chromatography.

(Acid Value)
The acid value was measured by dissolving the resultant high molecular polyetherpolyester into pure water to obtain a 1.5 wt % aqueous solution of the high molecular polyetherpolyester and subjecting this solution to neutralization titration with a 0.1 mol/l aqueous potassium hydroxide solution.

(Carboxyl value)
The definition of the carboxyl value is aforementioned, in which the molar number of functional group (2) in the high molecular polyetherpolyester per mol of R in the high molecular polyetherpolyester (per mol of the polyvalent acid anhydride as charged for the reaction) is defined as the carboxyl value. Specifically, the carboxyl value was determined from the above-measured acid value and number-average molecular weight in accordance with the following equation:

$$\text{carboxyl value} = \frac{\text{acid value}}{\text{number of bonding sites}}$$

wherein the unit of the acid value is (KOH: mg/polymer: 1 g), and the number of bonding sites are determined from the following equation:

$$\text{number of bonding sites} = \frac{\text{number-average molecular weight of high molecular polyetherpolyester}}{\text{molecular weight of starting low molecular polyalkylene oxide}}$$

In addition, as to the high molecular polyetherpolyester in which M is at least one type selected from the group consisting of metal atoms, an ammonium group, and organic amine groups, the carboxyl value can be determined by dissolving the resultant high molecular polyetherpolyester into pure water and adding an acid such as hydrochloric acid to the resultant solution to entirely free the metal atoms, the ammonium group, or the organic amine groups, thereby entirely freeing the carboxyl group (showing weak acidity), and then determining the carboxyl value with regard to the resultant free carboxyl group in the same way as is above-mentioned.

(Melt viscosity)
The melt viscosity was measured with a flow tester (model No. CFT-500C) made by SHIMADZU CORPORATION. Measurement conditions were as follows: 150° C., constant temperature method, cylinder pressure=30 kgf/cm². In addition, the size of the die was follows: L (length)=1.00 mm, D (diameter of opening)=0.50 mm.

(Tensile strength and elongation)
The tensile strength and the elongation were measured when the fracture occurred in a tensile test as carried out at a test speed of 20 mm/min in accordance with JIS K7121.

EXAMPLES A2 TO A5

High molecular polyetherpolyesters (A2) to (A5) were obtained by carrying out reactions in the same way as of Example A1 except that the molecular weight of the poly (ethylene glycol) was changed to those which are shown in Table A1. Then, films (A2) to (A5) were obtained in the same way as of Example A1. Results thereof are collectively shown in Table A1.

EXAMPLES A6 TO A8

High molecular polyetherpolyesters (A6) to (A8) were obtained by carrying out reactions in the same way as of Example A1 except that the molecular weight of the poly (ethylene glycol) was changed to those which are shown in Table A1, and that the type of the polyvalent acid anhydride was changed to 3,4,9,10-perylenetetracarboxylic dianhydride. Then, films (A6) to (A8) were obtained in the same way as of Example A1. Results thereof are collectively shown in Table A1.

EXAMPLE A9

High molecular polyetherpolyester (A9), containing calcium carboxylate as formed by displacing the hydrogen atom of the carboxyl group with calcium, was obtained by carrying out a chain extension reaction in the same way as of Example A1 except that 0.108 parts of calcium carbonate was further added when the raw materials were charged. Then, film (A9) was obtained in the same way as of Example A1. Results thereof are collectively shown in Table A1.

EXAMPLE A10

High molecular polyetherpolyester (A10), containing organic ammonium carboxylate as formed by displacing the hydrogen atom of the carboxyl group with an organic amine group, was obtained by carrying out a chain extension reaction in the same way as of Example A1 except that 0.231 parts of 1,4-diazabicyclo[2.2.2]octane was further added when the raw materials were charged. Then, film (A10) was obtained in the same way as of Example A1. Results thereof are collectively shown in Table A1.

film (A11) was obtained in the same way as of Example A1. Results thereof are collectively shown in Table A1.

EXAMPLE A12

High molecular polyetherpolyester (A12), containing organic ammonium carboxylate as formed by displacing the hydrogen atom of the carboxyl group with an organic amine group, was obtained by carrying out a chain extension reaction in the same way as of Example A1 except that 0.111 parts of 1,4-diazabicyclo[2.2.2]octane was added to high molecular polyetherpolyester (A8) which was obtained in Example A8 and stood in a melted state immediately after the reaction. Then, film (A12) was obtained in the same way as of Example A1. Results thereof are collectively shown in Table A1.

TABLE A1

|  | Example A1 | Example A2 | Example A3 | Example A4 | Example A5 | Example A6 |
|---|---|---|---|---|---|---|
| Poly(ethylene glycol) (number-average molecular weight) | 10 parts (10,000) | 10 parts (4,000) | 10 parts (2,000) | 10 parts (30,000) | 10 parts (13,000) | 10 parts (30,000) |
| Divalent acid anhydride | 0.207 parts | 0.537 parts | 1.085 parts | 0.071 parts | 0.158 parts | 0.129 parts |
| Number-average molecular weight of resultant high molecular polyetherpolyester | 84,000 | 72,000 | 61,000 | 162,000 | 100,000 | 141,000 |
| Acid value | 16.0 | 35.1 | 61.3 | 11.4 | 16.9 | 10.5 |
| Carboxyl value | 1.91 | 1.95 | 2.01 | 2.11 | 2.20 | 2.24 |
| Melt viscosity ($\times 10^4$ cP) | 10.2 | 9.1 | 6.2 | 15.4 | 10.8 | 14.6 |
| Tensile strength (kgf/cm$^2$) | 95 | 92 | 85 | 220 | 167 | 179 |
| Elongation (%) | 912 | 783 | 396 | 2,611 | 1,604 | 1,870 |

|  | Example A7 | Example A8 | Example A9 | Example A10 | Example A11 | Example A12 |
|---|---|---|---|---|---|---|
| Poly(ethylene glycol) (number average molecular weight) | 10 parts (1,000) | 10 parts (20,000) | 10 parts (10,000) | 10 parts (10,000) | 10 parts (20,000) | 10 parts (20,000) |
| Divalent acid anhydride | 3.812 parts | 0.180 parts | 0.207 parts | 0.207 parts | 0.180 parts | 0.180 parts |
| Number average molecular weight of resultant high molecular polyetherpolyester | 51,000 | 146,000 | 112,000 | 99,000 | 155,000 | 145,000 |
| Acid value | 97.9 | 15.4 | 21.3 | 18.9 | 16.3 | 15.3 |
| Carboxyl value | 1.92 | 2.11 | 1.91 | 1.91 | 2.11 | 2.11 |
| Melt viscosity ($\times 10^4$ cP) | 5.6 | 20.1 | 10.5 | 10.1 | 19.3 | 18.8 |
| Tensile strength (kgf/cm$^2$) | 83 | 186 | 105 | 95 | 188 | 97 |
| Elongation (%) | 221 | 1,918 | 980 | 160 | 1,880 | 180 |

EXAMPLE A11

High molecular polyetherpolyester (A11), containing calcium carboxylate as formed by displacing the hydrogen atom of the carboxyl group with calcium, was obtained by adding 0.051 parts of calcium carbonate to high molecular polyetherpolyester (A8), which was obtained in Example A8 and stood in a melted state immediately after the reaction, and then heating and stirring the resultant mixture for 1 hour under the same reaction conditions as of Example A8. Then,

Comparative Examples A1 to A3

Comparative high molecular polyetherpolyesters (A1) to (A3) were obtained by carrying out reactions in the same way as of Example A1 except that the molecular weight of the poly(ethylene glycol) as well as the charge ratio of the pyromellitic dianhydride to the poly(ethylene glycol) were changed to those which are shown in Table A2. Then, an attempt to form the resultant polyetherpolyesters into films was made in the same way as of Example A1. As a result, comparative films (A2) and (A3) were obtained, but comparative film (A1) was not obtained. Results thereof are collectively shown in Table A2.

TABLE A2

|  | Comparative Example A1 | Comparative Example A2 | Comparative Example A3 |
|---|---|---|---|
| Poly(ethylene glycol) (number-average molecular weight) | 10 parts (1,000) | 10 parts (15,000) | 10 parts (30,000) |
| Divalent acid anhydride | 4.310 parts | 0.014 parts | 0.022 parts |
| Number-average molecular weight of resultant high molecular polyetherpolyester | 22,000 | 38,000 | 45,000 |
| Acid value | 8.62 | 0.53 | 0.88 |
| Carboxyl value | 3.92 | 0.21 | 0.59 |
| Melt viscosity ($\times 10^4$ cP) | 0.05 | 1.1 | 2.1 |
| Tensile strength (kgf/cm$^2$) | — | 40 | 70 |
| Elongation (%) | — | 150 | 180 |

As is shown in Tables A1 and A2, all the melt viscosities of the high molecular polyetherpolyesters as obtained in the above-mentioned A-numbered Examples fall within the viscosity range that is appropriate for mold-processing into films, so the high molecular polyetherpolyesters resultant from the A-numbered Examples can be molded into films. In addition, the films as obtained in the A-numbered Examples are all more excellent in mechanical strength than the films of the A-numbered Comparative Examples.

Comparative Example A4

A mixture of 10 parts of poly(ethylene glycol) with a number-average molecular weight of 10,000 and 0.194 parts of dimethyl terephthalate was charged into a 100 ml flask to carry out a chain extension reaction for 8 hours under reaction conditions of 0.0001 MPa and 150° C., thus obtaining comparative high molecular polyetherpolyester (A4) having a number-average molecular weight of 125,000. The acid number of comparative high molecular polyetherpolyester (A4) was 0.0 mg KOH/g (accordingly, the carboxyl value of comparative high molecular polyetherpolyester (A4) was also 0).

Multilayered films for evaluation were prepared from high molecular polyetherpolyester (A5), as obtained in Example A5, comparative high molecular polyetherpolyester (A4), as obtained in Comparative Example A4, and polyethylene oxide of a molecular weight of 200,000 (reagent made by Aldrich, Inc.; acid value 0.0 mg KOH/g), respectively, by interposing each of these sample polymers between two sheets of PET film of 100 μm in thickness and then molding them with a compression molding machine under the following conditions: molding temperature=150° C., molding pressure=100 kgf/cm$^2$, and molding time=2 minutes.

The peeling strength of the resultant multilayered films was measured with a device, made by Tester Industries Co., Ltd., in the following way: The multilayered films were cut into a width of 25 mm and a length of about 20 to 25 cm, and respective ends of the two sheets of PET film in the multilayered films were fixed on upper and lower load cells of the measurement device, and the two sheets of PET film were peeled off from each sample polymer at a tensile speed of 300 mm/min, when the resistance to the peeling was measured as the peeling strength.

As a result, the measured values of the peeling strength of high molecular polyetherpolyester (A5), as obtained in Example A5, comparative high molecular polyetherpolyester (A4), as obtained in Comparative Example A4, and the polyethylene oxide of a molecular weight of 200,000 (made by Aldrich, Inc.) were 60 gf/25 mm, 23 gf/25 mm, and 16 gf/25 mm, respectively.

Thus, the peeling strength of comparative high molecular polyetherpolyester (A4) is almost the same as that of the polyethylene oxide of a molecular weight of 200,000 (carboxyl values of these polymers are both zero), while high molecular polyetherpolyester (A5) of Example A5 having a carboxyl value of 2.20 displays about three times as high peeling strength as comparative high molecular polyetherpolyester (A4) and the polyethylene oxide of a molecular weight of 200,000 do.

Therefore, if a high molecular polyetherpolyester having such a large carboxyl value as that of high molecular polyetherpolyester (A5) is used for various materials such as multilayered films and binders for metal-sintering, the high molecular polyetherpolyester displays good adhesion to these materials and is accordingly useful.

EXAMPLE B1

A mixture of 10 parts of poly(ethylene glycol) with a number-average molecular weight of 20,000 and 0.106 parts of pyromellitic dianhydride was charged into a 100 ml flask (the molar ratio of the acid anhydride group in the pyromellitic dianhydride to the hydroxyl group in the poly(ethylene glycol) (acid anhydride group/hydroxyl group) was 0.97) to carry out a chain extension reaction for 4 hours under reaction conditions of 0.100 MPa and 150° C. The resultant high molecular polyetherpolyester (B1) had a number-average molecular weight of 146,000.

Film (B1) of 200 μm in thickness was obtained by molding high molecular polyetherpolyester (B1) with a compression molding machine under the following conditions: molding temperature=150° C., molding pressure=100 kgf/cm$^2$, and molding time=2 minutes. A tensile test was carried out for film (B1). As a result, the tensile strength was 187 kgf/cm$^2$, and the elongation was 2,001%.

These results are collectively shown in Table B1.

EXAMPLES B2 TO B6

High molecular polyetherpolyesters (B2) to (B6) were obtained by carrying out reactions in the same way as of Example B1 except that the molecular weight of the poly(ethylene glycol) as well as the molar ratio of the acid anhydride group in the pyromellitic dianhydride to the hydroxyl group in the poly(ethylene glycol) (acid anhydride group/hydroxyl group) was changed to those which are shown in Table B1. Then, films (B2) to (B6) were obtained in the same way as of Example B1. Results thereof are collectively shown in Table B1.

EXAMPLES B7 TO B8

High molecular polyetherpolyesters (B7) to (B8) were obtained by carrying out reactions in the same way as of Example B1 except that the pyromellitic dianhydride was replaced with 3,4,9,10-perylenetetracarboxylic dianhydride, and that other conditions were also changed to those which are shown in Table B1. Then, films (B7) to (B8) were obtained in the same way as of Example B1. Results thereof are collectively shown in Table B1.

EXAMPLE B9

High molecular polyetherpolyester (B9), containing calcium carboxylate as formed by displacing the hydrogen atom of the carboxyl group with calcium, was obtained by carrying out a chain extension reaction in the same way as of Example B1 except that 0.058 parts of calcium carbonate was further added when the raw materials were charged. Then, film (B9) was obtained in the same way as of Example B1. Results thereof are collectively shown in Table B1.

EXAMPLE B10

High molecular polyetherpolyester (B10), containing organic ammonium carboxylate as formed by displacing the hydrogen atom of the carboxyl group with an organic amine group, was obtained by carrying out a chain extension reaction in the same way as of Example B1 except that 0.119 parts of 1,4-diazabicyclo[2.2.2]octane was further added when the raw materials were charged. Then, film (B10) was obtained in the same way as of Example B1. Results thereof are collectively shown in Table B1.

under the same reaction conditions as of Example B8. Then, film (B11) was obtained in the same way as of Example B1. Results thereof are collectively shown in Table B1.

EXAMPLE B12

High molecular polyetherpolyester (B12), containing organic ammonium carboxylate as formed by displacing the hydrogen atom of the carboxyl group with an organic amine group, was obtained by carrying out a chain extension reaction in the same way as of Example B1 except that 0.120 parts of 1,4-diazabicyclo[2.2.2]octane was added to high molecular polyetherpolyester (B8) which was obtained in Example B8 and stood in a melted state immediately after the reaction. Then, film (B12) was obtained in the same way as of Example B1. Results thereof are collectively shown in Table B1.

TABLE B1

|  | Example B1 | Example B2 | Example B3 | Example B4 | Example B5 | Example B6 |
|---|---|---|---|---|---|---|
| Poly(ethylene glycol) (number-average molecular weight) | 10 parts (20,000) | 10 parts (4,000) | 10 parts (13,000) | 10 parts (15,000) | 10 parts (15,000) | 10 parts (2,000) |
| Molar charge ratio *1 | 0.97 | 0.90 | 0.95 | 0.92 | 0.85 | 0.97 |
| Reaction temperature (°C.) | 150 | 160 | 80 | 120 | 140 | 135 |
| Number-average molecular weight of resultant high molecular polyetherpolyester | 146,000 | 62,000 | 67,000 | 132,000 | 102,000 | 141,000 |
| Tensile strength (kgf/cm$^2$) | 187 | 87 | 91 | 171 | 145 | 192 |
| Elongation (%) | 2,001 | 412 | 450 | 1,935 | 1,325 | 2,021 |
|  | Example B7 | Example B8 | Example B9 | Example B10 | Example B11 | Example B12 |
| Poly(ethylene glycol) (number-average molecular weight) | 10 parts (8,000) | 10 parts (20,000) | 10 parts (20,000) | 10 parts (20,000) | 10 parts (20,000) | 10 parts (20,000) |
| Molar charge ratio *1 | 0.91 | 0.99 | 0.97 | 0.97 | 0.99 | 0.99 |
| Reaction temperature (°C.) | 145 | 155 | 150 | 150 | 155 | 155 |
| Number-average molecular weight of resultant high molecular polyetherpolyester | 75,000 | 138,000 | 148,000 | 145,000 | 154,000 | 135,000 |
| Tensile strength (kgf/cm$^2$) | 132 | 185 | 188 | 99 | 181 | 97 |
| Elongation (%) | 850 | 1,988 | 2,203 | 198 | 1,991 | 125 |

*1: Molar ratio of acid anhydride group in divalent acid anhydride to hydroxyl group in poly(ethylene glycol) (acid anhydride group/hydroxyl group)

EXAMPLE B11

High molecular polyetherpolyester (B11), containing calcium carboxylate as formed by displacing the hydrogen atom of the carboxyl group with calcium, was obtained by adding 0.055 parts of calcium carbonate to high molecular polyetherpolyester (B8), which was obtained in Example B8 and stood in a melted state immediately after the reaction, and then heating and stirring the resultant mixture for 1 hour

Comparative Examples B1 TO B4

Comparative high molecular polyetherpolyesters (B1) to (B4) were obtained by carrying out reactions in the same way as of Example B1 except that the molecular weight of the poly(ethylene glycol), the molar charge ratio of the pyromellitic dianhydride, and the reaction temperature were changed to those which are shown in Table B2. Then, an attempt to form the resultant polyetherpolyesters into films was made in the same way as of Example B1. As a result, comparative films (B1) and (B4) were obtained, but comparative films (B2) and (B3) were not obtained. Results thereof are collectively shown in Table B2.

TABLE B2

|  | Comparative Example B1 | Comparative Example B2 | Comparative Example B3 | Comparative Example B4 |
|---|---|---|---|---|
| Poly(ethylene glycol) (number-average molecular weight) | 10 parts (15,000) | 10 parts (8,000) | 10 parts (4,000) | 10 parts (20,000) |
| Molar charge ratio *1 | 0.61 | 1.22 | 0.42 | 0.39 |
| Reaction temperature (°C.) | 150 | 160 | 80 | 120 |
| Number average molecular weight of resultant high molecular polyetherpolyester | 33,000 | 26,000 | 18,000 | 41,000 |
| Tensile strength (kgf/cm$^2$) | 21 | — | — | 35 |
| Elongation (%) | 65 | — | — | 93 |

*1: Molar ratio of acid anhydride group in divalent acid anhydride to hydroxyl group in poly(ethylene glycol) (acid anhydride group/hydroxyl group)

As is shown in Tables B1 and B2, the high molecular polyetherpolyesters as obtained in the above-mentioned B-numbered Examples had a larger number-average molecular weight and more excellent mechanical strength of the films thereof than the comparative high molecular polyetherpolyesters as obtained in the B-numbered Comparative Examples did.

EXAMPLE B13

A mixture of 10 parts of poly(ethylene glycol) with a number-average molecular weight of 13,000 and 0.158 parts of pyromellitic dianhydride was charged into a 100 ml flask to carry out a chain extension reaction for 2 hours at 120° C. under a vacuum of 0.003 MPa. The resultant high molecular polyetherpolyester had a number-average molecular weight of 160,000.

The film strength of the resultant high molecular polyetherpolyester was measured in the same way as of Example B1. As a result, the tensile strength was 118 kgf/cm$^2$, and the elongation was 513%.

EXAMPLE B14

A mixture of 10 parts of poly(ethylene glycol) with a number-average molecular weight of 13,000 and 0.158 parts of pyromellitic dianhydride was charged into a 100 ml flask to carry out a chain extension reaction for 2.5 hours at 120° C. under a vacuum of 0.0066 MPa. The resultant high molecular polyetherpolyester had a number-average molecular weight of 157,000.

The film strength of the resultant high molecular polyetherpolyester was measured in the same way as of Example B1. As a result, the tensile strength was 162 kgf/cm$^2$, and the elongation was 834%.

Compatative Example B5

A mixture of 10 parts of poly(ethylene glycol) with a number-average molecular weight of 13,000 and 0.158 parts of pyromellitic dianhydride was charged into a 100 ml flask to carry out a chain extension reaction for 2 hours at 120° C. under a vacuum of 66.6–399.9 Pa. The resultant high molecular polyetherpolyester had a number-average molecular weight of 107,000.

The film strength of the resultant high molecular polyetherpolyester was measured in the same way as of Example B1. As a result, the tensile strength was 98 kgf/cm$^2$, and the elongation was 96%.

Comparative Example B6

A mixture of 10 parts of poly(ethylene glycol) with a number-average molecular weight of 13,000 and 0.158 parts of pyromellitic dianhydride was charged into a 100 ml flask to carry out a chain extension reaction for 2 hours at 150° C. under a vacuum of 666 Pa. The resultant high molecular polyetherpolyester had a number-average molecular weight of 83,000.

The film strength of the resultant high molecular polyetherpolyester was measured in the same way as of Example B1. As a result, the tensile strength was 47 kgf/cm$^2$, and the elongation was 185%.

Compatative Example B7

A mixture of 10 parts of poly(ethylene glycol) with a number-average molecular weight of 13,000 and 0.161 parts of pyromellitic dianhydride was charged into a 100 ml flask to carry out a chain extension reaction for 2 hours at 120° C. under a vacuum of 0.0013 MPa. The resultant high molecular polyetherpolyester had a number-average molecular weight of 115,000.

The film strength of the resultant high molecular polyetherpolyester was measured in the same way as of Example B1. As a result, the tensile strength was 104 kgf/cm$^2$, and the elongation was 73%.

Thus, the films, as obtained in Examples B1 to B14 in which the reaction was not carried out under high vacuum, show higher strength than the films as obtained in Comparative Examples B5 to B7 in which the reaction was carried out under high vacuum.

Accordingly, it clear that where the polymerization is carried out under high vacuum, unfavorable branching is caused, and the mechanical strength of the resultant molded product is low.

EXAMPLE C

A mixture of 0.065 parts of sodium hydroxide and 15 parts of triethylene glycol was charged into an autoclave, of which the internal atmosphere was then replaced with a nitrogen gas. Next, the autoclave was gradually heated to 150° C. under stirring conditions, and while maintaining the internal pressure of the autoclave within the range of 0 to 0.98 MPa at 150° C., 570 parts of ethylene oxide was continuously introduced into the autoclave over a period of 20 hours. After the introduction of ethylene oxide, an aging reaction was carried out at 150° C. for 2.0 hours, and the temperature of the system of reaction was reverted to normal temperature, thus obtaining a low molecular poly(ethylene oxide) in a yield of 99%.

As a result of the measurement by gel permeation chromatography, the number-average molecular weight of the resultant poly(ethylene oxide) was 13,000.

Next, 500 parts of the resultant low molecular poly (ethylene oxide) was charged into "1-Liter Kneader," made by Irie Shokai Co., Ltd., and then melted by heating at 150° C. Thereafter, 7.8 part of pyromellitic dianhydride was added to carry out a chain extension reaction for 30 minutes at 150° C. and a reaction pressure of 0.100 MPa.

As a result of the measurement by gel permeation chromatography, the number-average molecular weight of the resultant high molecular polyetherpolyester was 112,000.

EXAMPLE C2

The low molecular poly(ethylene oxide), as obtained in the same way as of Example C1 and melted at 150° C., and pyromellitic dianhydride were continuously charged into a sideways type twin-screw extruder for high viscosity at a feed rate of 20 parts/min and 0.312 parts/min, respectively, to carry out a chain extension reaction at 150° C. and a reaction pressure of 0.100 MPa, wherein the residence time was 10 minutes, which passed since the low molecular poly(ethylene oxide) was charged into the extruder until a high molecular product resultant from the reaction of the low molecular poly(ethylene oxide) with the pyromellitic dianhydride was taken out from an outlet of the extruder.

As a result of the measurement by gel permeation chromatography, the number-average molecular weight of the resultant high molecular polyetherpolyester was 103,000.

EXAMPLE C3

A mixture of 10 parts of the low molecular poly(ethylene oxide) with a number-average molecular weight of 13,000, as obtained in Example C1, and 0.1 parts of pyromellitic dianhydride was charged into a 100 ml flask to carry out a chain extension reaction for 6 hours at 150° C. under a reaction pressure of 0.100 MPa.

As a result of the measurement by gel permeation chromatography, the number-average molecular weight of the resultant high molecular polyetherpolyester was 45,000.

The high molecular polyetherpolyesters, as obtained in Examples C1 and C2 where the chain extension reaction was carried out using a reaction apparatus for high viscosity, had a larger number-average molecular weight and were produced in a very shorter reaction time, when compared with the high molecular polyetherpolyester as obtained in Example C3 where the chain extension reaction was carried out using a flask that was not a reaction apparatus for high viscosity.

EXAMPLE D1

Commercially available poly(ethylene glycol) (made by Wako Pure Chemical Industries, Ltd., number-average molecular weight: 20,000, water content: 1 wt %) was charged into a reactor as equipped with a stirrer, a vacuum line, and a heating jacket. The poly(ethylene glycol) was devolatilized by heat-melting at 150° C. under a high vacuum of 0.0067 MPa and stirred for 2 hours, thus obtaining poly(ethylene glycol) (D1) having a water content of 1,000 ppm and a number-average molecular weight of 20,000.

Next, 100 parts of poly(ethylene glycol) (D1) and 1.07 parts of pyromellitic dianhydride were charged into a reactor as equipped with a vacuum line and a heating jacket, and then reacted with each other at a jacket temperature of 140° C. under normal pressure for 30 minutes, thus obtaining a high molecular polyetherpolyester having a number-average molecular weight of 100,000.

EXAMPLE D2

Commercially available poly(ethylene glycol) (made by Wako Pure Chemical Industries, Ltd., number-average molecular weight: 20,000, water content: 1 wt %) was charged into a reactor as equipped with a stirrer, a vacuum line, and a heating jacket. The poly(ethylene glycol) was devolatilized by heat-melting at 150° C. under a vacuum of 13.33 Pa and stirred for 2 hours, thus obtaining poly(ethylene glycol) (D2) having a water content of 100 ppm and a number-average molecular weight of 20,000.

Next, 100 parts of poly(ethylene glycol) (D2) and 1.07 parts of pyromellitic dianhydride were charged into a reactor as equipped with a vacuum line and a heating jacket, and then reacted with each other at a jacket temperature of 120° C. under normal pressure for 2 hours, thus obtaining a high molecular polyetherpolyester having a number-average molecular weight of 158,000.

EXAMPLE D3

A high molecular polyetherpolyester was obtained in the same way as of Example D2 except that 0.60 parts of calcium carbonate was added to carry out the reaction between poly(ethylene glycol) and pyromellitic dianhydride. The number-average molecular weight of the resultant high molecular polyetherpolyester was 162,000.

Comparative Example D

A high molecular polyetherpolyester was obtained in the same way as of Example D1 except that poly(ethylene glycol) was not devolatilized under vacuum. The number-average molecular weight of the resultant high molecular polyetherpolyester was 37,800.

As is clear from the results of Examples D1 to D3 and Comparative Example D, the number-average molecular weights of the high molecular polyetherpolyesters, resultant from Examples D1 to D3 in which the chain extension reaction was carried out under conditions where the water content in the system of reaction was reduced by devolatilizing the starting low molecular polyalkylene oxide and the inside of the system of reaction under vacuum, are all higher than that of the high molecular polyetherpolyester resultant from Comparative Example D in which the water content in the system of reaction was not reduced.

EXAMPLE E1

A mixture of 500 parts of poly(ethylene glycol) of 13,000 in number-average molecular weight, 4.08 parts of calcium carbonate (neutralizer), and 7.86 parts of pyromellitic dianhydride was charged into a 1-liter kneader to carry out a chain extension reaction for 30 minutes under reaction conditions of 0.099 MPa and 150° C. The resultant high molecular polyetherpolyester had a number-average molecular weight of 125,000. A film as molded from the resultant high molecular polyetherpolyester was transparent, uniform, and good-looking. As to the mechanical strength of this film, the tensile strength was 120 kgf/cm$^2$, and the elongation was 1,620%.

EXAMPLE E2

A film was obtained by carrying a reaction in the same way as of Example E1 except that the neutralizer was changed to zinc oxide. Results are collectively shown in Table E1.

EXAMPLE E3

A film was obtained by carrying a reaction in the same way as of Example E1 except that the neutralizer was changed to magnesium oxide. Results are collectively shown in Table E1.

EXAMPLE E4

A film was obtained by carrying a reaction in the same way as of Example E1 except that the neutralizer was changed to 1,4-diazabicyclo[2.2.2]octane. Results are collectively shown in Table E1.

EXAMPLE E5

A film was obtained by carrying a reaction in the same way as of Example E1 except that the divalent acid anhydride was changed to butane-1,2,3,4-tetracarboxylic dianhydride. Results are collectively shown in Table E1.

EXAMPLE E6

A film was obtained by carrying a reaction in the same way as of Example E1 except that the divalent acid anhydride was changed to 3,3',4,4'-diphenylsulfonetetracarboxylic dianhydride. Results are collectively shown in Table E1.

EXAMPLES E7 TO E10

Films were obtained by carrying reactions in the same way as of Example E1 except that the molecular weight of the poly(ethylene glycol), the reaction temperature, and the respective amounts of the addition of the neutralizer and the divalent acid anhydride were changed to those which are shown in Table E1. Results are collectively shown in Table E1.

TABLE E1

|  | Example E1 | Example E2 | Example E3 | Example E4 | Example E5 |
|---|---|---|---|---|---|
| Number-average molecular weight of poly(ethylene glycol) | 13,000 (500 parts) | 13,000 (500 parts) | 13,000 (500 parts) | 13,000 (500 parts) | 13,000 (500 parts) |
| Neutralizer (parts) | Calcium carbonate (4.08) | Zinc oxide (3.22) | Magnesium oxide (1.54) | Dabco (9.14) | Calcium carbonate (4.07) |
| Divalent acid anhydride (parts) | PMDA (7.86) | PMDA (7.86) | PMDA (7.86) | PMDA (7.86) | BTDA (7.07) |
| Reaction temperature (°C.) | 150 | 150 | 150 | 150 | 150 |
| Number average molecular weight of resultant high molecular polyetherpolyester | 125,000 | 131,000 | 139,000 | 122,000 | 135,000 |
| Properties of film | Transparent and uniform | Transparent and uniform | Transparent and uniform | Translucent and uniform | Transparent and uniform |
| Tensile strength (kgf/cm$^2$) | 120 | 108 | 138 | 141 | 90 |
| Elongation (%) | 1,620 | 1,300 | 1,905 | 591 | 1,286 |

|  | Example E6 | Example E7 | Example B8 | Example E9 | Example E10 |
|---|---|---|---|---|---|
| Number-average molecular weight of poly(ethylene glycol) | 13,000 (500 parts) | 20,000 (500 parts) | 10,000 (500 parts) | 4,000 (500 parts) | 20,000 (500 parts) |
| Neutralizer (parts) | Calcium carbonate (4.07) | Calcium carbonate (3.01) | Calcium carbonate (4.96) | Calcium carbonate (13.8) | Metal sodium (1.39) |
| Divalent acid anhydride (parts) | DSDA (13.4) | PMDA (5.44) | PMDA (9.94) | PMDA (27.3) | PMDA (5.29) |
| Reaction temperature (°C.) | 150 | 110 | 100 | 130 | 130 |
| Number-average molecular weight of resultant high molecular polyetherpolyester | 131,000 | 157,000 | 139,000 | 122,000 | 132,000 |
| Properties of film | Transparent and uniform | Transparent and uniform | Transparent and uniform | Transparent and uniform | Transparent and uniform |
| Tensile strength (kgf/cm$^2$) | 95 | 162 | 142 | 155 | 125 |
| Elongation (%) | 1,312 | 1,619 | 1,587 | 1,723 | 1,820 |

Dabco: 1,4-Diazabicyclo[2.2.2]octane
PMDA: Pyromellitic dianhydride
DSDA: 3,3',4,4'-diphenylsulfonetetracarboxylic dianhydride
BTDA: Butane-1,2,3,4-tetracarboxylic dianhydride

EXAMPLE E11

A mixture of 500 parts of poly(ethylene glycol) of 13,000 in number-average molecular weight and 7.86 parts of pyromellitic dianhydride was charged into a 1-liter kneader to carry out a chain extension reaction for 30 minutes under reaction conditions of 0.097 MPa and 150° C. The resultant unneutralized high molecular polyetherpolyester had a number-average molecular weight of 128,000.

Next, 15 parts of the unneutralized high molecular polyetherpolyester, as obtained above, was charged into a 100 ml flask, into which 50 parts of toluene was then added, and the contents of the flask was then heated to 100° C. to dissolve the unneutralized high molecular polyetherpolyester. Thereafter, 0.324 parts of zinc acetylacetonate was added as a neutralizer, and the resultant mixture was heated and stirred for 2 hours. Then, the toluene solvent was removed under vacuum, thus obtaining a neutralized high molecular polyetherpolyester.

A film as molded from the high molecular polyetherpolyester resultant from the above-mentioned neutralization procedure was translucent, non-uniform, and dappled. As to the mechanical strength of this film, the tensile strength was 37 kgf/cm$^2$, and the elongation was 281%.

EXAMPLE E12

A film was obtained by carrying a reaction in the same way as of Example E11 except that the neutralizer was changed to sodium acetate. Results are collectively shown in Table E2.

EXAMPLE E13

A film was obtained by carrying a reaction in the same way as of Example E11 except that the neutralizer was changed to calcium hydride. Results are collectively shown in Table E2.

EXAMPLE E14

A film was obtained by carrying a reaction in the same way as of Example E11 except that the neutralizer was changed to magnesium acetate. Results are collectively shown in Table E2.

EXAMPLE E15

A film was obtained by carrying a reaction in the same way as of Example E11 except that the neutralizer was changed to metal sodium. Results are collectively shown in Table E2.

Comparative Example E

A mixture of 10 parts of a low molecular poly(ethylene oxide) with a number-average molecular weight of 14,000 and 0.143 parts of dimethyl terephthalate was charged into a 100 ml flask to carry out a chain extension reaction for 6 hours at 150° C. under a vacuum of 133.3 Pa, thus obtaining a high molecular polyetherpolyester having a number-average molecular weight of 95,000. The mechanical strength of a film as molded from the resultant high molecular polyetherpolyester was measured. As a result, the tensile strength was 65 kgf/cm$^2$, and the elongation was 30%.

TABLE E2

|  | Example E11 | Example E12 | Example E13 | Example E14 | Example E15 |
|---|---|---|---|---|---|
| Number-average molecular weight of unneutralized high molecular polyetherpolyester | 128,000 (15 parts) | 128,000 (15 parts) | 128,000 (15 parts) | 128,000 (15 parts) | 128,000 (15 parts) |
| Neutralizer (parts) | Zn(II)-AA (0.324) | Sodium acetate (0.177) | Calcium hydride (0.045) | Magnesium acetate (0.230) | Metal sodium (0.051) |
| Neutralization temperature (°C.) | 100 | 100 | 100 | 100 | 100 |
| Properties of film | Non-uniform and dappled | Non-uniform and dappled | Non-uniform and dappled | Non-uniform and dappled | Non-uniform and dappled |
| Tensile strength (kgf/cm$^2$) | 37 | 44 | 78 | 91 | 86 |
| Elongation (%) | 281 | 308 | 471 | 1.85 | 223 |

Zn(II)-AA: Zinc acetylacetonate

As is shown in Tables E1 and E2, the high molecular polyetherpolyesters, as obtained in Examples E1 to E10, in which the carboxyl group on the side chain was neutralized, show more excellent mechanical strength of the films thereof than the high molecular polyetherpolyester of Comparative Example E does. In addition, the high molecular polyetherpolyesters of Examples E1 to E10 show higher mechanical strength of the films thereof and provide more uniform films than those of Examples E11 to E15 do.

EXAMPLE F1

A mixture of 10 parts of poly(ethylene glycol) with a number-average molecular weight of 20,000 and 0.106 parts of pyromellitic dianhydride was charged into a 100 ml flask to carry out a chain extension reaction for 4 hours under atmospheric pressure at 150° C. As a result of the measurement by gel permeation chromatography, the number-average molecular weight of the resultant high molecular polyetherpolyester was 126,000.

EXAMPLE F2

A mixture of 10 parts of poly(ethylene glycol) with a number-average molecular weight of 13,000 and 0.152 parts of pyromellitic dianhydride was charged into a 100 ml flask to carry out a chain extension reaction for 4 hours under atmospheric pressure at 150° C. As a result of the measurement by gel permeation chromatography, the number-average molecular weight of the resultant high molecular polyetherpolyester was 91,000.

EXAMPLE F3

A mixture of 500 parts of poly(ethylene glycol) of 14,000 in number-average molecular weight, 7.7 parts of pyromellitic dianhydride, and 4.02 parts of calcium carbonate was charged into a 1-liter desktop kneader to carry out a chain extension reaction for 30 minutes under atmospheric pressure at 150° C. As a result of the measurement by gel permeation chromatography, the number-average molecular weight of the resultant high molecular polyetherpolyester was 111,000.

EXAMPLE F4

A mixture of 500 parts of poly(ethylene glycol) of 13,000 in number-average molecular weight, 7.9 parts of pyromellitic dianhydride, and 3.43 parts of zinc oxide was charged into a 1-liter desktop kneader to carry out a chain extension reaction for 35 minutes under atmospheric pressure at 140° C. As a result of the measurement by gel permeation chromatography, the number-average molecular weight of the resultant high molecular polyetherpolyester was 105,000.

EXAMPLE F5

A mixture of 500 parts of poly(ethylene glycol) of 13,500 in number-average molecular weight, 7.7 parts of pyromellitic dianhydride, and 1.67 parts of magnesium oxide was charged into a 1-liter desktop kneader to carry out a chain extension reaction for 30 minutes under atmospheric pressure at 150° C. As a result of the measurement by gel permeation chromatography, the number-average molecular weight of the resultant high molecular polyetherpolyester was 125,000.

EXAMPLE F6

A mixture of 500 parts of poly(ethylene glycol) of 13,000 in number-average molecular weight, 7.6 parts of pyromellitic dianhydride, and 4.55 parts of 1,4-diazabicyclo[2.2.2]octane was charged into a 1-liter desktop kneader to carry out a chain extension reaction for 30 minutes under atmospheric pressure at 150° C. As a result of the measurement by gel permeation chromatography, the number-average molecular weight of the resultant high molecular polyetherpolyester was 104,000.

EXAMPLE F7

A mixture of 500 parts of poly(ethylene glycol) of 14,000 in number-average molecular weight and 7.5 parts of pyromellitic dianhydride was charged into a 1-liter desktop kneader to carry out a chain extension reaction for 30 minutes under atmospheric pressure at 145° C. Next, 4.02 parts of calcium carbonate was added to the resultant polyetherpolyester, and the resultant mixture was heated and stirred for 30 minutes. As a result of the measurement by gel permeation chromatography, the number-average molecular weight of the resultant high molecular polyetherpolyester was 114,000.

EXAMPLE F8

A mixture of 500 parts of poly(ethylene glycol) of 12,000 in number-average molecular weight and 7.9 parts of pyromellitic dianhydride was charged into a 1-liter desktop kneader to carry out a chain extension reaction for 30 minutes under atmospheric pressure at 155° C. Next, 4.77 parts of 1,4-diazabicyclo[2.2.2]octane was added to the resultant polyetherpolyester, and the resultant mixture was heated and stirred for 30 minutes. As a result of the measurement by gel permeation chromatography, the number-average molecular weight of the resultant high molecular polyetherpolyester was 108,000.

Comparative Example F

A mixture of 10 parts of poly(ethylene glycol) of 20,000 in number-average molecular weight and 0.146 parts of dimethyl terephthalate was charged into a 100 ml flask to carry out a chain extension reaction for 4 hours under a vacuum of 13.33 Pa at 150° C. As a result of the measurement by gel permeation chromatography, the number-average molecular weight of the resultant high molecular polyetherpolyester was 111,000.

EXAMPLE G1

The high molecular polyetherpolyester with a number-average molecular weight of 126,000, as obtained in Example F1, was extruded under conditions of rotor temperature=100° C., screw revolution number=120 rpm, T-die temperature=115° C., T-die clearance=0.5 mm with CS-194AV Max Mixing Extruder (made by Custom Scientific Instruments, Inc.), and while the extruded polyetherpolyester was extended to four times, compressed air of 5° C. was blown to the polyetherpolyester to cool the film temperature to 15° C. in about 10 seconds, thus obtaining a film. The thickness of the resultant film as well as the tensile strength and the elongation of the resultant film in a direction of the device are shown in Table G1.

EXAMPLES G2 TO G8

Films were obtained in the same way as of Example G1 except that the high molecular polyetherpolyester as prepared in Example F1 was replaced with the high molecular polyetherpolyesters as prepared in Examples F2 to F8. The thickness of the resultant films as well as the tensile strength and the elongation of the resultant films in a direction of the device are shown in Table G1.

Comparative Example G1

An attempt to obtain a film was made in the same way as of Example G1 except that the high molecular polyetherpolyester as prepared in Example F1 was replaced with poly(ethylene oxide) having a number-average molecular weight of 77,000 in terms of polystyrene (reagent made by Aldrich, Inc.; average molecular weight=100,000).

As a result, a film-like product was obtained, but this was very brittle, and the tensile strength thereof was unmeasurable. Results are shown Table G1.

Comparative Example G2

An attempt to obtain a film was made in the same way as of Example G1 except that the high molecular polyetherpolyester as prepared in Example F1 was replaced with the high molecular polyetherpolyester which was obtained in Comparative Example F and had a number-average molecular weight of 111,000 in terms of polystyrene.

As a result, a film-like product was obtained, but this was very brittle, and the tensile strength thereof was unmeasurable. Results are shown Table G1.

TABLE G1

|  | Thickness of film (μm) | Tensile strength (kgf/cm$^2$) | Elongation (%) |
| --- | --- | --- | --- |
| Example G1 | 156 | 172 | 1,530 |
| Example G2 | 143 | 162 | 1,450 |
| Example G3 | 161 | 115 | 1,720 |
| Example G4 | 130 | 108 | 1,320 |
| Example G5 | 173 | 138 | 1,907 |
| Example G6 | 149 | 141 | 145 |
| Example G7 | 156 | 108 | 1,542 |
| Example G8 | 144 | 145 | 132 |
| Comparative Example G1 | 147 | — | 20 |
| Comparative Example G2 | 138 | — | 28 |

As is seen in Table G1, although the high molecular polyetherpolyesters in the films of the G-numbered Examples have nearly the same number-average molecular weight as of the polymers in the films of the G-numbered Comparative Examples, the films of the G-numbered Examples have more excellent mechanical strength than the films of the G-numbered Comparative Examples. Accordingly, it is clear that the films of the G-numbered Examples comprising the high molecular polyetherpolyesters are tough hydrophilic films.

EXAMPLE H1

A mixture of 2,265 parts of poly(ethylene glycol) of 20,000 in number-average molecular weight and 24.0 parts of pyromellitic dianhydride was charged into a kneader case part of a kneaderuder of 35 mm in screw diameter, as equipped with a 10-liter kneader case, to carry out a chain extension reaction under a pressure of 0.099 MPa at a kneader case part temperature of 150° C. for 30 minutes. After the reaction, the number-average molecular weight of the resultant high molecular polyetherpolyester, which was present in the kneader case, was measured. As a result, it was 113,000. Then, the kneader case part temperature was changed to 100° C., and the screw temperature and the cylinder temperature were both changed to 90° C. Then, the high molecular polyetherpolyester was extruded into the shape of a strand with a screw, and the resultant strand was treated with a pelletizer, thus obtaining a pellet comprising a high molecular polyetherpolyester. The resultant high molecular polyetherpolyester had a number-average molecular weight of 115,000.

EXAMPLE H2

A mixture of 2,255 parts of poly(ethylene glycol) of 20,000 in number-average molecular weight, 13.1 parts of calcium carbonate, and 24.2 parts of pyromellitic dianhydride was charged into a kneader case part of a kneaderuder of 35 mm in screw diameter, as equipped with a 10-liter kneader case, to carry out a chain extension reaction under a pressure of 0.098 MPa at a kneader case part temperature of 150° C. for 30 minutes. After the reaction, the kneader case part temperature was changed to 110° C. and the screw temperature and the cylinder temperature were both changed to 95° C. Then, the resultant high molecular polyetherpolyester was extruded into the shape of a strand with a screw, and the resultant strand was treated with a pelletizer, thus obtaining a pellet comprising a high molecular polyetherpolyester. The resultant high molecular polyetherpolyester had a number-average molecular weight of 122,000.

EXAMPLE H3

A mixture of 2,141 parts of poly(ethylene glycol) of 13,000 in number-average molecular weight and 33.6 parts of pyromellitic dianhydride was charged into a kneader case part of a kneaderuder of 35 mm in screw diameter, as equipped with a 10-liter kneader case, to carry out a chain extension reaction under a pressure of 0.099 MPa at a kneader case part temperature of 120° C. for 90 minutes. After the reaction, the kneader case part temperature was changed to 100° C., and the screw temperature and the cylinder temperature were both changed to 85° C. Then, the resultant high molecular polyetherpolyester was extruded into the shape of a strand with a screw, and the resultant strand was treated with a pelletizer, thus obtaining a pellet comprising a high molecular polyetherpolyester. The resultant high molecular polyetherpolyester had a number-average molecular weight of 139,000.

EXAMPLE H4

A mixture of 2,036 parts of poly(ethylene glycol) of 14,000 in number-average molecular weight, 16.6 parts of calcium carbonate, and 32.0 parts of pyromellitic dianhydride was charged into a kneader case part of a kneaderuder of 35 mm in screw diameter, as equipped with a 10-liter kneader case, to carry out a chain extension reaction under a pressure of 0.097 MPa at a kneader case part temperature of 140° C. for 110 minutes. After the reaction, the kneader case part temperature was changed to 95° C., and the screw temperature and the cylinder temperature were both changed to 100° C. Then, the resultant high molecular polyetherpolyester was extruded into the shape of a strand with a screw, and the resultant strand was treated with a pelletizer, thus obtaining a pellet comprising a high molecular polyetherpolyester. The resultant high molecular polyetherpolyester had a number-average molecular weight of 141,000.

EXAMPLE H5

A mixture of 1,999 parts of poly(ethylene glycol) of 18,000 in number-average molecular weight and 22.4 parts of butane-1,2,3,4-tetracarboxylic dianhydride was charged into a kneader case part of a kneaderuder of 35 mm in screw diameter, as equipped with a 10-liter kneader case, to carry out a chain extension reaction under a pressure of 0.098 MPa at a kneader case part temperature of 150° C. for 40 minutes. After the reaction, the kneader case part temperature was changed to 105° C., and the screw temperature and the cylinder temperature were both changed to 90° C. Then, the resultant high molecular polyetherpolyester was extruded into the shape of a strand with a screw, and the resultant strand was treated with a pelletizer, thus obtaining a pellet comprising a high molecular polyetherpolyester. The resultant high molecular polyetherpolyester had a number-average molecular weight of 111,000.

EXAMPLE H6

A mixture of 2,121 parts of poly(ethylene glycol) of 20,000 in number-average molecular weight and 33.0 parts of 3,3',4,4'-benzophenonetetracarboxylic dianhydride was charged into a kneader case part of a kneaderuder of 35 mm in screw diameter, as equipped with a 10-liter kneader case, to carry out a chain extension reaction under a pressure of 0.096 MPa at a kneader case part temperature of 150° C. for 30 minutes. After the reaction, the kneader case part temperature was changed to 100° C., and the screw temperature and the cylinder temperature were both changed to 90° C.

Then, the resultant high molecular polyetherpolyester was extruded into the shape of a strand with a screw, and the resultant strand was treated with a pelletizer, thus obtaining a pellet comprising a high molecular polyetherpolyester. The resultant high molecular polyetherpolyester had a number-average molecular weight of 129,000.

EXAMPLE H7

A mixture of 2,198 parts of poly(ethylene glycol) of 12,000 in number-average molecular weight, 17.2 parts of zinc oxide, and 38.9 parts of pyromellitic dianhydride was charged into a kneader case part of a kneaderuder of 35 mm in screw diameter, as equipped with a 10-liter kneader case, to carry out a chain extension reaction under a pressure of 0.098 MPa at a kneader case part temperature of 145° C. for 45 minutes. After the reaction, the kneader case part temperature was changed to 115° C., and the screw temperature and the cylinder temperature were both changed to 85° C. Then, the resultant high molecular polyetherpolyester was extruded into the shape of a strand with a screw, and the resultant strand was treated with a pelletizer, thus obtaining a pellet comprising a high molecular polyetherpolyester. The resultant high molecular polyetherpolyester had a number-average molecular weight of 133,000.

EXAMPLE H8

A mixture of 2,312 parts of poly(ethylene glycol) of 20,000 in number-average molecular weight, 5.2 parts of magnesium oxide, and 24.2 parts of pyromellitic dianhydride was charged into a kneader case part of a kneaderuder of 35 mm in screw diameter, as equipped with a 10-liter kneader case, to carry out a chain extension reaction under a pressure of 0.098 MPa at a kneader case part temperature of 135° C. for 60 minutes. After the reaction, the kneader case part temperature was changed to 100° C., and the screw temperature and the cylinder temperature were both changed to 90° C. Then, the resultant high molecular polyetherpolyester was extruded into the shape of a strand with a screw, and the resultant strand was treated with a pelletizer, thus obtaining a pellet comprising a high molecular polyetherpolyester. The resultant high molecular polyetherpolyester had a number-average molecular weight of 165,000.

EXAMPLE H9

A mixture of 1,859 parts of poly(ethylene glycol) of 16,000 in number-average molecular weight, 15.9 parts of 1,4-diazabicyclo[2.2.2]octane, and 25.1 parts of pyromellitic dianhydride was charged into a kneader case part of a kneaderuder of 35 mm in screw diameter, as equipped with a 10-liter kneader case, to carry out a chain extension reaction under a pressure of 0.098 MPa at a kneader case part temperature of 110° C. for 100 minutes. After the reaction, the kneader case part temperature was changed to 95° C., and the screw temperature and the cylinder temperature were both changed to 100° C. Then, the resultant high molecular polyetherpolyester was extruded into the shape of a strand with a screw, and the resultant strand was treated with a pelletizer, thus obtaining a pellet comprising a high molecular polyetherpolyester. The resultant high molecular polyetherpolyester had a number-average molecular weight of 125,000.

EXAMPLE H10

A mixture of 2,239 parts of poly(ethylene glycol) of 20,000 in number-average molecular weight, 5.1 parts of metal sodium, and 22.0 parts of pyromellitic dianhydride was charged into a kneader case part of a kneaderuder of 35 mm in screw diameter, as equipped with a 10-liter kneader case, to carry out a chain extension reaction under a pressure of 0.098 MPa at a kneader case part temperature of 140° C. for 45 minutes. After the reaction, the kneader case part temperature was changed to 110° C., and the screw temperature and the cylinder temperature were both changed to 95° C. Then, the resultant high molecular polyetherpolyester was extruded into the shape of a strand with a screw, and the resultant strand was treated with a pelletizer, thus obtaining a pellet comprising a high molecular polyetherpolyester. The resultant high molecular polyetherpolyester had a number-average molecular weight of 134,000.

EXAMPLE H11

A mixture of 2,215 parts of poly(ethylene glycol) of 8,000 in number-average molecular weight and 59.2 parts of pyromellitic dianhydride was charged into a kneader case part of a kneaderuder of 35 mm in screw diameter, as equipped with a 10-liter kneader case, to carry out a chain extension reaction under a pressure of 0.098 MPa at a kneader case part temperature of 110° C. for 115 minutes. After the reaction, the kneader case part temperature was changed to 90° C., and the screw temperature and the cylinder temperature were both changed to 85° C. Then, the resultant high molecular polyetherpolyester was extruded into the shape of a strand with a screw, and the resultant strand was treated with a pelletizer, thus obtaining a pellet comprising a high molecular polyetherpolyester. The resultant high molecular polyetherpolyester had a number-average molecular weight of 75,000.

EXAMPLE H12

A mixture of 1,989 parts of poly(ethylene glycol) of 10,000 in number-average molecular weight, 24.3 parts of calcium carbonate, and 42.2 parts of pyromellitic dianhydride was charged into a kneader case part of a kneaderuder of 35 mm in screw diameter, as equipped with a 10-liter kneader case, to carry out a chain extension reaction under a pressure of 0.097 MPa at a kneader case part temperature of 140° C. for 70 minutes. After the reaction, the kneader case part temperature was changed to 100° C., and the screw temperature and the cylinder temperature were both changed to 90° C. Then, the resultant high molecular polyetherpolyester was extruded into the shape of a strand with a screw, and the resultant strand was treated with a pelletizer, thus obtaining a pellet comprising a high molecular polyetherpolyester. The resultant high molecular polyetherpolyester had a number-average molecular weight of 83,000.

EXAMPLE I1

Poly(ethylene glycol) of 15,000 in number-average molecular weight, as melted at 150° C., calcium carbonate, as dispersed into the melted poly(ethylene glycol), and a solution of pyromellitic dianhydride in 1,3-dioxolane were continuously charged into a twin-screw extruder of 30 mm in die diameter at a cylinder temperature of 140° C. and at a feed rate of 20 parts/min as poly(ethylene glycol), 0.104 parts/min as calcium carbonate, and 0.288 pars/min as pyromellitic dianhydride to carry out a chain extension reaction under a vacuum of 0.011 MPa while removing 1,3-dioxolane. The residence time, until the resultant polymer was taken out from a die at an outlet of the extruder, was 12 minutes. However, the melt tension of the resultant polymer at the outlet was too low to pull the resultant strand.

The resultant high molecular polyetherpolyester had a number-average molecular weight of 89,000.

EXAMPLE I2

Poly(ethylene glycol) of 20,000 in number-average molecular weight, as melted at 150° C., calcium carbonate, as dispersed into the melted poly(ethylene glycol), and a solution of pyromellitic dianhydride in 1,3-dioxolane were continuously charged into a twin-screw extruder of 30 mm in die diameter at a cylinder temperature of 150° C. and at a feed rate of 18 parts/min as poly(ethylene glycol), 0.115 parts/min as calcium carbonate, and 0.194 pars/min as pyromellitic dianhydride to carry out a chain extension reaction under a vacuum of 0.0099 MPa while removing 1,3-dioxolane. The residence time, until the resultant polymer was taken out from a die at an outlet of the extruder, was 10 minutes. However, the melt tension of the resultant polymer at the outlet was too low to pull the resultant strand. The resultant high molecular polyetherpolyester had a number-average molecular weight of 95,000.

EXAMPLE I3

Poly(ethylene glycol) of 20,000 in number-average molecular weight, as melted at 150° C., and a solution of pyromellitic dianhydride in 1,3-dioxolane were continuously charged into a twin-screw extruder of 30 mm in die diameter at a cylinder temperature of 120° C. and at a feed rate of 20 parts/min as poly(ethylene glycol) and 0.221 pars/min as pyromellitic dianhydride to carry out a chain extension reaction under a vacuum of 0.013 MPa while removing 1,3-dioxolane. The residence time, until the resultant polymer was taken out from a die at an outlet of the extruder, was 12 minutes. However, the melt tension of the resultant polymer at the outlet was too low to pull the resultant strand. The resultant high molecular polyetherpolyester had a number-average molecular weight of 56,000.

EXAMPLE I4

A mixture of 6,502 parts of poly(ethylene glycol) of 14,000 in number-average molecular weight, 52.9 parts of calcium carbonate, and 101.1 parts of pyromellitic dianhydride was charged into a 20-liter kneader to carry out a chain extension reaction under a pressure of 0.098 MPa at a kneader case part temperature of 145° C. for 60 minutes. After the reaction, the number-average molecular weight of the resultant high molecular polyetherpolyester, which was taken out from the kneader, was measured. As a result, it was 97,000. At this stage, the high molecular polyetherpolyester was obtained as a lumpish polymer.

Next, in order to pelletize this lumpish polymer, it was once melted by heating, and then poured into a gear pump, thus obtaining a strand-shaped high molecular polyetherpolyester, which was then pelletized to obtain a pellet. The finally resultant pellet-shaped high molecular polyetherpolyester had a number-average molecular weight of 78,000.

As is clear from the results of Examples H1 to H12, if the production apparatus (which comprises both a single- or twin-screw extruder and a sideways type twin-shaft kneader, wherein the kneader includes agitation shafts which have a row of transformational wings and are arranged in parallel to each other) (kneaderuder) is used to synthesize a high molecular polyetherpolyester, the high molecular polyetherpolyester can be produced in the form of a pellet regardless of differences in the aforementioned various reaction conditions or various molecular weights.

Or otherwise, as is clear from the results of Examples I1 to I3, where a conventional twin-screw extruder is used to synthesize a high molecular polyetherpolyester, it is difficult to synthesize a polymer having a number-average molecular weight of 100,000 or more. In addition, even if various conditions such as temperature conditions were changed, a high molecular polyetherpolyester could not be produced in the form of a pellet.

Furthermore, as is clear from the results of Example H1, if the kneaderuder is used to synthesize a high molecular polyetherpolyester, a pellet can be obtained involving no molecular weight reduction. On the other hand, Example I4, where the kneaderuder is not used, can provide a pellet, but it involves great reduction of the molecular weight. In addition, because the reacted polymer is once cooled and then melted by heating in Example I4, the procedure thereof is complicated and inefficient.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A high molecular neutralized polyetherpolyester, which comprises structural unit (1) of formula (1) below and functional group (2) of formula (2) below and has a number-average weight of 40,000 to 10,000,000, wherein the ratio of functional group (2) is in the range of 1.0 to 3.0 mol per mol of R in the polyetherpolyester, a) wherein formula (1) is:

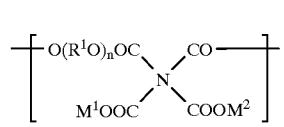

wherein
R$^1$ is a divalent organic group with 2 to 6 carbon atoms;
R is a tetravalent organic group with 4 to 20 carbon atoms;
M$^1$ and M$^2$ are selected from the group consisting of metal atoms, an ammonium group, and organic amine groups; and
n is an integer of 25 to 700;
b) wherein formula (2) is:
wherein
M is selected from the group consisting of metal atoms, an ammonium group, and organic amine groups;
c) and wherein said polyetherpolyester, which comprises said formula (1) and said formula (2), is neutralized with a neutralizer in an amount effective to give a salt of the resultant polyetherpolyester.

2. A high molecular neutralized polyetherpolyester according to claim 1, wherein the ratio of structural unit (1) per molecule of the high molecular polyetherpolyester is 20 wt % or more.

3. A high molecular neutralized polyetherpolyester, which is obtained by a process comprising the step of carrying out a chain extension reaction of a low molecular polyalkylene oxide of a number-average molecular weight of 1,000 to 30,000 with a polyvalent acid anhydride in the presence of a neutralizer, with the amount of the neutralizer being effective to give a salt of the resultant polyetherpolyester, wherein the polyvalent acid anhydride is divalent acid anhydride (3) of formula (3) below, and functional group (2) of formula (2) below is contained in a ratio of 1.0 to 3.0 mol per mol of R in the high molecular polyetherpolyester, wherein formula (2) is:

—COOM    (2)

wherein

M is selected from the group consisting of metal atoms, an ammonium group, and organic amine groups;

and wherein formula (3) is:

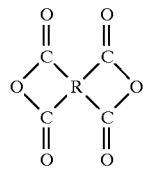

(3)

wherein

R is a tetravalent organic group with 4 to 20 carbon atoms.

4. A process for producing a high molecular neutralized polyetherpolyester, which comprises the step of carrying out a chain extension reaction of a low molecular polyalkylene oxide of 1,000 to 30,000 in number-average molecular weight with a polyvalent acid anhydride, wherein the chain extension reaction is carried out under conditions where:
a) the polyvalent acid anhydride is divalent acid anhydride (3);
b) the reaction pressure is 0.003 MPa or higher;
c) and the low molecular polyalkylene oxide and the polyvalent acid anhydride are charged such that the acid anhydride group in the polyvalent acid anhydride is in the range of 0.8 to 1.0 mol per mol of the hydroxyl group in the low molecular polyalkylene oxide; and wherein a neutralizer is added to one of i) the low molecular polyalkylene oxide and the polyvalent acid a anhydride during the chain extension reaction and ii) the resultant polyetherpolyester after the chain extension reaction, with the amount of the neutralizer being effective to give a salt of the resultant polyetherpolyester.

5. A process according to claim 4, wherein the neutralizer is added either or both of at the beginning of the chain extension reaction and during the chain extension reaction.

6. A process according to claim 4, wherein the neutralizer is a carbonic salt.

7. A process according to claim 4, wherein the neutralizer is a carbonic salt.

8. A process according to claim 4, wherein the chain extension reaction is carried out under conditions where the water content in the system of reaction is 5,000 ppm or less.

9. A process according to claim 4, wherein the chain extension reaction is carried out using a reaction apparatus for high viscosity.

10. A process according to claim 9, wherein the reaction apparatus for high viscosity has a paddle.

11. A process according to claim 9, wherein the reaction apparatus for high viscosity is a single- or twin-screw extruder.

12. A process according to claim 9, wherein the reaction apparatus for high viscosity is a sideways twin-shaft kneader including agitation shafts which have a row of transformational wings and are arranged in parallel to each other.

13. A process according to claim 12, wherein the reaction apparatus for high viscosity is an apparatus comprising both a single- or twin-screw extruder and a sideways twin-shaft kneader, wherein the kneader includes agitation shafts which have a row of transformational wings and are arranged in parallel to each other.

14. A process according to claim 13, which further comprises the step of pelletizing the resultant high molecular polyetherpolyester.

15. A packaging material film, which comprises a high molecular polyetherpolyester as recited in claim 1 and has a tensile strength of 80 kgf/cm$^2$ or more.

16. A packaging material film, which comprises a high molecular polyetherpolyester as recited in claim 1 and has an elongation of 100% or more.

17. A packaging material film according to claim 15, which is obtained by a process comprising the steps of:

extruding a resin including the high molecular polyetherpolyester into the shape of a film with a film-molding machine at an outlet temperature of the film-molding machine of 50 to 250° C.; and cooling the resultant film to a temperature of −10 to 50° C. in a cooling period of time of 2 seconds to 5 minutes.

18. A packaging material film according to claim 16, which is obtained by a process comprising the steps of:

extruding a resin including the high molecular polyetherpolyester into the shape of a film with a film-molding machine at an outlet temperature of the film-molding machine of 50 to 250° C.; and cooling the resultant film to a temperature of −10 to 50° C. in a cooling period of time of 2 seconds to 5 minutes.

19. A packaging material film according to claim 15, which is hydrophilic.

20. A packaging material film according to claim 16, which is hydrophilic.

21. A process according to claim 4 wherein the neutralizer is at least one compound selected from the group consisting of carbonates and oxides.

22. A process according to claim 4 wherein the neutralizer comprises a metallic compound that is an oxide.

23. A process according to claim 4 wherein the neutralizer comprises a metallic compound that is a carbonate.

* * * * *